(12) United States Patent
Urabayashi et al.

(10) Patent No.: US 11,115,980 B2
(45) Date of Patent: Sep. 7, 2021

(54) BASE STATION AND RADIO TERMINAL

(71) Applicant: KYOCERA Corporation, Kyoto (JP)

(72) Inventors: Hiroyuki Urabayashi, Yokohama (JP);
Masato Fujishiro, Yokohama (JP);
Chiharu Yamazaki, Tokyo (JP)

(73) Assignee: KYOCERA Corporation, Kyoto (JP)

(*) Notice: Subject to any disclaimer, the term of this patent is extended or adjusted under 35 U.S.C. 154(b) by 35 days.

(21) Appl. No.: 16/481,018

(22) PCT Filed: Jan. 24, 2018

(86) PCT No.: PCT/JP2018/002140
§ 371 (c)(1),
(2) Date: Jul. 25, 2019

(87) PCT Pub. No.: WO2018/143033
PCT Pub. Date: Aug. 9, 2018

(65) Prior Publication Data
US 2020/0008198 A1    Jan. 2, 2020

Related U.S. Application Data

(60) Provisional application No. 62/454,193, filed on Feb. 3, 2017.

(51) Int. Cl.
*H04W 72/04* (2009.01)
*H04L 5/00* (2006.01)
(Continued)

(52) U.S. Cl.
CPC ....... *H04W 72/0453* (2013.01); *H04L 5/0012* (2013.01); *H04W 4/70* (2018.02); *H04L 5/0094* (2013.01); *H04W 76/27* (2018.02)

(58) Field of Classification Search
CPC ..... H04L 5/0012; H04L 5/0091–0098; H04W 4/70; H04W 72/044–048
See application file for complete search history.

(56) References Cited

U.S. PATENT DOCUMENTS

2017/0347268 A1* 11/2017 Chen .................... H04B 1/7143
2018/0092101 A1*  3/2018 Xia .................... H04W 72/0453
(Continued)

FOREIGN PATENT DOCUMENTS

WO    2016/186044 A1    11/2016

OTHER PUBLICATIONS

Nokia et al.; "Frequency Hopping Support for FeMTC"; 3GPP TSG RAN WG1 Meeting #87; R1-1611481; Nov. 14-18, 2016; pp. 1-2; Reno, NV, USA.

*Primary Examiner* — Marcus Smith
(74) *Attorney, Agent, or Firm* — Studebaker & Brackett PC

(57) ABSTRACT

A base station performs radio communication with a radio terminal using at least one narrow frequency band where the number of resource blocks is limited to a predetermined resource block number. The base station comprises a transmitter configured to transmit, to the radio terminal, configuration information for frequency hopping where the radio communication is performed while switching the narrow frequency band; and a controller configured to allocate, to the radio terminal, a first frequency band of the frequency hopping and a frequency band of a hopping destination. The first frequency band and the frequency band of the hopping destination respectively include the narrow frequency band and fraction resource blocks. The fraction resource blocks are resource blocks, the number of which is smaller than the predetermined resource block number. The controller is configured to make the number of the fraction resource blocks included in the frequency band of the hopping destination equal to the number of the fraction resource blocks included in the first frequency band.

6 Claims, 14 Drawing Sheets

(51) Int. Cl.
*H04W 4/70* (2018.01)
*H04W 76/27* (2018.01)

(56) References Cited

U.S. PATENT DOCUMENTS

| | | | |
|---|---|---|---|
| 2018/0152924 A1 | 5/2018 | Ouchi | |
| 2018/0219576 A1* | 8/2018 | Bhattad | H04W 72/0446 |
| 2018/0309551 A1* | 10/2018 | Baldemair | H04L 5/0053 |
| 2019/0028247 A1* | 1/2019 | Liu | H04W 4/70 |
| 2019/0230739 A1* | 7/2019 | Ookubo | H04W 88/08 |

* cited by examiner

BASE STATION AND RADIO TERMINAL

TECHNICAL FIELD

This disclosure relates to a base station and a radio terminal for mobile communication system.

BACKGROUND ART

Recently, studies have been made with respect to a radio terminal which is used in a Machine Type Communication (MTC) service where communication is performed without requiring human intervention. Such a radio terminal is requested to realize the reduction of a cost, providing a broader coverage, and the reduction of power consumption.

In a 3rd Generation Partnership Project (3GPP) which is a standardization project of a mobile communication system, a new radio terminal category is prescribed where a transmission/reception bandwidth is limited to only a portion of a system transmission/reception band.

In such a radio terminal which adopts the new category, a frequency bandwidth used for transmission and reception of a radio signal is limited. Accordingly, the radio terminal performs radio communication using a narrow frequency band which forms a part of a system transmission/reception band. The narrow frequency band has, for example, a frequency bandwidth of 1.08 MHz (that is, a frequency bandwidth of 6 resource blocks).

Under such circumstances, it is considered that there is a need in using an MTC not only to a sensor where only data communication of small capacity is expected but also to a wearable terminal or the like where data communication having larger capacity than the sensor is expected. To satisfy such a need, it is desirable to increase a throughput of the MTC.

SUMMARY OF INVENTION

A base station according to one embodiment performs radio communication with a radio terminal using at least one narrow frequency band where the number of resource blocks is limited to a predetermined resource block number. The base station comprises a transmitter configured to transmit, to the radio terminal, configuration information for frequency hopping where the radio communication is performed while switching the narrow frequency band; and a controller configured to allocate, to the radio terminal, a first frequency band of the frequency hopping and a frequency band of a hopping destination. The first frequency band and the frequency band of the hopping destination respectively include the narrow frequency band and fraction resource blocks. The fraction resource blocks are resource blocks, the number of which is smaller than the predetermined resource block number. The controller is configured to make the number of the fraction resource blocks included in the frequency band of the hopping destination equal to the number of the fraction resource blocks included in the first frequency band.

A user terminal according to one embodiment performs radio communication with a base station using at least one narrow frequency band where the number of resource blocks is limited to a predetermined resource block number. The user terminal a receiver configured to receive, from the base station, configuration information for performing frequency hopping where the radio communication is performed while switching the narrow frequency band, and allocation information relating to allocation of a first frequency band of the frequency hopping and a frequency band of a hopping destination, and a controller configured to control the radio communication using the frequency hopping based on the configuration information and the allocation information. The first frequency band and the frequency band of the hopping destination respectively include the narrow frequency band allocated from the base station. One frequency band out of the first frequency band and the frequency band of the hopping destination further includes the fraction resource blocks allocated from the base station. The fraction resource blocks are resource blocks, the number of which is smaller than the predetermined resource block number. The controller is configured to decide whether or not the fraction resource blocks are to be used in the radio communication with respect to the other frequency band out of the first frequency band and the frequency band of the hopping destination.

DESCRIPTION OF EMBODIMENTS (Configuration of Mobile Communication System)

Figure 1:
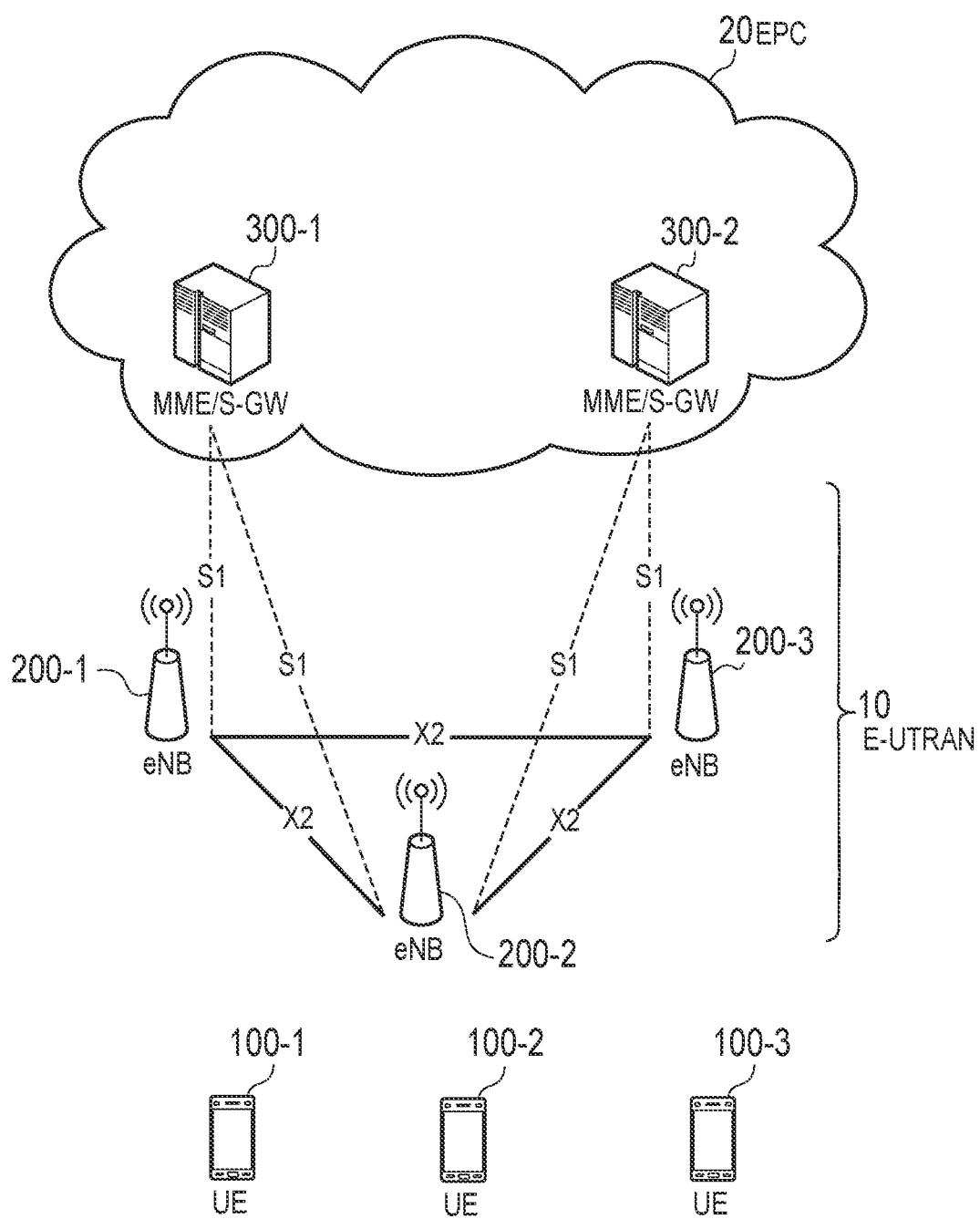
FIG. 1 is a view illustrating the configuration of a mobile communication system according to an embodiment.

The configuration of a mobile communication system according to an embodiment is described. FIG. 1 is a view illustrating the configuration of a Long Term Evolution (LTE) system which is the mobile communication system according to the embodiment. The LTE system is a mobile communication system which conforms to a 3GPP standard.

As illustrated in FIG. 1, the LTE system includes radio terminals (UE: User Equipments) 100, a radio access network (E-UTRAN: Evolved-UMTS Terrestrial Radio Access Network) 10, and a core network (EPC: Evolved Packet Core) 20.

The UE 100 is a mobile communication apparatus, and performs radio communication with an eNB 200 which manages a cell (serving cell) in which the UE 100 per se exists.

The E-UTRAN 10 includes the base stations (eNBs: evolved Node-Bs) 200. The eNBs 200 are interconnected with each other via X2 interfaces. The eNB 200 manages one or a plurality of cells, and performs radio communication with the UE 100 which establishes connection with the own cell. The eNB 200 has a radio resource management (RRM) function, a routing function of user data (hereinafter, simply referred to as "data"), a measurement control function for a mobility control and scheduling and the like. "Cell" is used as a term indicating a minimum unit of a radio communication area, and is also used as a term indicating a function or a resource for performing radio communication with the UE 100.

The EPC 20 includes mobility management entities (MMEs) and serving gateways (S-GWs) 300. The MME applies various mobility controls and the like to the UE 100. The S-GW performs a data transmission control. The MMEs and the S-GWs are connected to the eNBs 200 via S1 interfaces.

Figure 2:
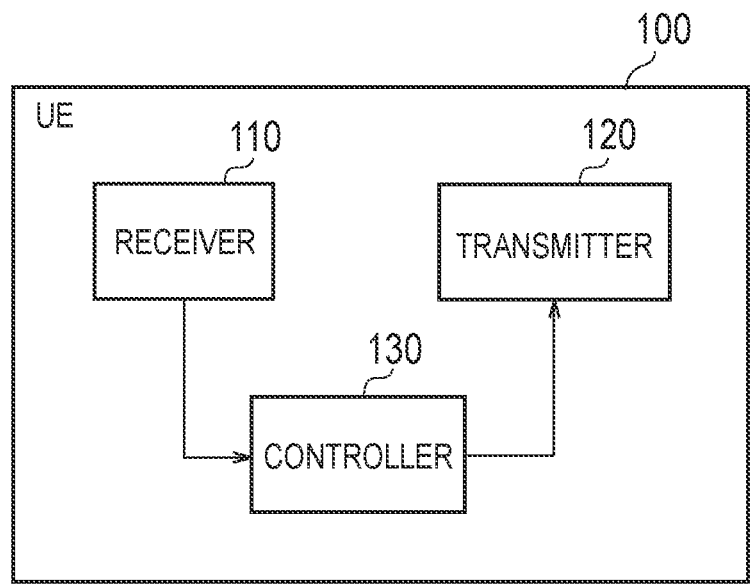
FIG. 2 is a view illustrating the configuration of a radio terminal according to the embodiment.

FIG. 2 is a view illustrating the configuration of the UE 100 (radio terminal). As illustrated in FIG. 2, the UE 100 includes a receiver 110, a transmitter 120, and a controller 130.

The receiver 110 performs various receptions under a control of the controller 130. The receiver 110 includes an antenna and a reception device. The reception device outputs a radio signal which the antenna receives to the controller 130 after converting the radio signal into a baseband signal (reception signal).

The transmitter 120 performs various transmissions under a control of the controller 130. The transmitter 120 includes an antenna and a transmission device. The transmission device transmits a baseband signal (transmission signal) which the controller 130 outputs from the antenna after converting the baseband signal into a radio signal.

The controller 130 performs various controls in the UE 100. The controller 130 includes at least one processor and a memory. The memory stores programs executed by the processor and information used in processing performed by the processor. The processor may include a baseband processor which performs modulation/demodulation, coding/decoding and the like of the baseband signal, and a Central Processing Unit (CPU) which performs various processing by executing programs stored in the memory. The processor performs processing described later.

Figure 3:
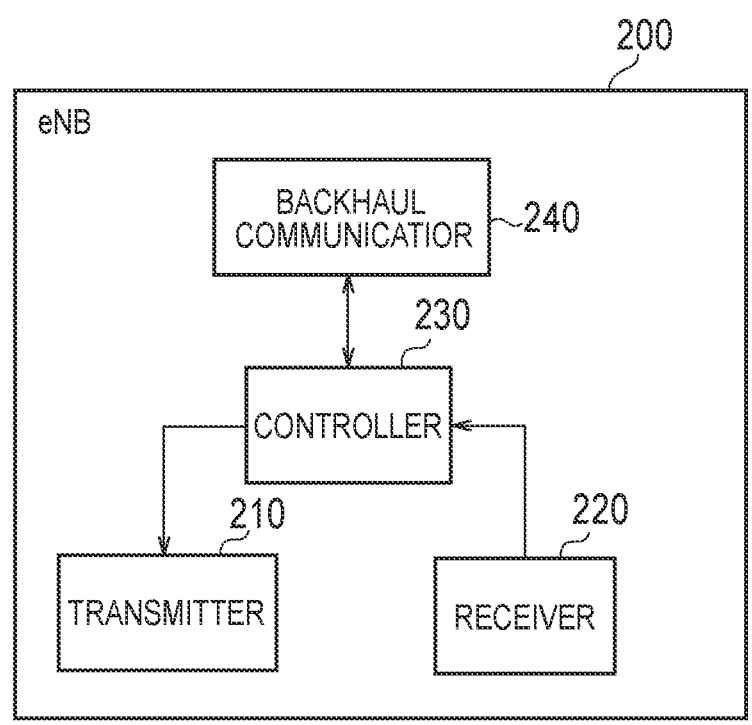
FIG. 3 is a view illustrating the configuration of a base station according to the embodiment.

FIG. 3 is a view illustrating the configuration of the eNB 200 (base station). As illustrated in FIG. 3, the eNB 200 includes a transmitter 210, a receiver 220, a controller 230, and a backhaul communication part 240.

The transmitter 210 performs various transmissions under a control of the controller 230. The transmitter 210 includes an antenna and a transmission device. The transmission device transmits a baseband signal (transmission signal) which the controller 230 outputs from the antenna after converting the baseband signal into a radio signal.

The receiver 220 performs various receptions under a control of the controller 230. The receiver 220 includes an antenna and a reception device. The reception device outputs a radio signal which the antenna received to the controller 230 after converting the radio signal into a baseband signal (reception signal).

The controller 230 performs various controls in the eNB 200. The controller 230 includes at least one processor and a memory. The memory stores programs executed by the processor and information used for processing performed by the processor. The processor may include a baseband processor which performs modulation/demodulation and coding/decoding and the like of the baseband signal, and a CPU which performs various processing by executing programs stored in the memory. The processor performs processing described later.

The backhaul communication part 240 is connected to the neighboring eNB via the X2 interface, and is connected to the MME/S-GW 300 via the S1 interface. The backhaul communication part 240 is used for communication performed on the X2 interface, communication performed on the S1 interface and the like.

Figure 4:
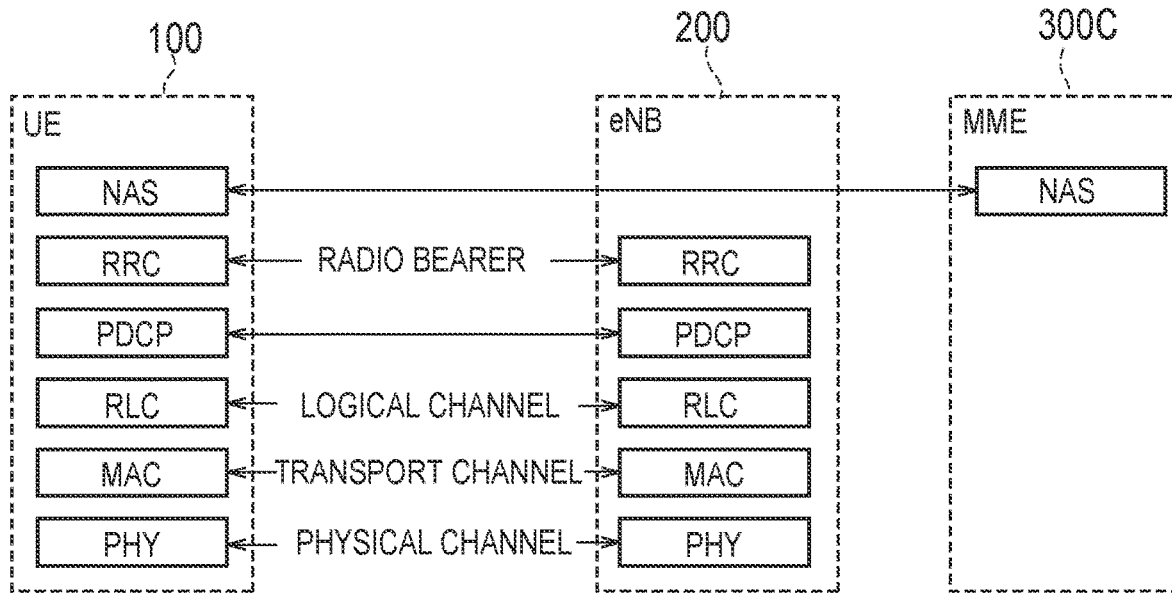
FIG. 4 is a view illustrating the configuration of a protocol stack of a radio interface in the mobile communication system according to the embodiment.

FIG. 4 is a view illustrating the configuration of a protocol stack of a radio interface in the LTE system. As illustrated in FIG. 4, the radio interface protocol is divided into a first layer to a third layer in an OSI reference model. The first layer is a physical (PHY) layer. The second layer includes a Medium Access Control (MAC) layer, a Radio Link Control (RLC) layer, and a Packet Data Convergence Protocol (PDCP) layer. The third layer includes a Radio Resource Control (RRC) layer.

The PHY layer performs coding/decoding, modulation/demodulation, antenna mapping/demapping, and resource mapping/demapping. Data and control information are transmitted between the PHY layer of the UE 100 and the PHY layer of the eNB 200 via a physical channel.

The MAC layer performs a priority control of data, retransmission processing by a hybrid ARQ (HARQ), a random access procedure and the like. Data and control information are transmitted between the MAC layer of the UE 100 and the MAC layer of the eNB 200 via a transport channel. The MAC layer of the eNB 200 includes a scheduler which decides a transport format (a transport block size, a modulation/coding method (MCS)) of an uplink and a downlink and an allocation resource block to the UE 100.

The RLC layer transmits data to the RLC layer on a reception side using functions of the MAC layer and the PHY layer. Data and control information are transmitted between the RLC layer of the UE 100 and the RLC layer of the eNB 200 via a logical channel.

A PDCP layer performs header compression/expansion and ciphering/deciphering.

The RRC layer is defined only on a control plane where control information is handled. RRC signaling for various establishment is transmitted between the RRC layer of the UE 100 and the RRC layer of the eNB 200. The RRC layer controls a logical channel, a transport channel, and a physical channel in response to the establishment, the re-establishment and the release of a radio bearer. When the connection (RRC connection) is established between the RRC of the UE 100 and the RRC of the eNB 200, the UE 100 is in an RRC connected mode. On the other hand, when such connection is not established, the UE 100 is in an RRC idle mode.

A NAS layer positioned at a higher level of the RRC layer performs a session control, a mobility control and the like.

NAS signaling is transmitted between the NAS layer of the UE 100 and the NAS layer of the MME 300C.

Figure 5:
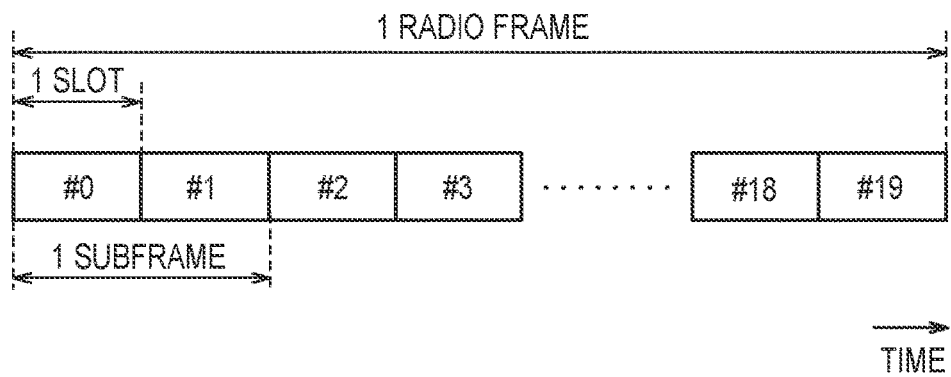
FIG. 5 is a view illustrating the configuration of a radio frame used in the mobile communication system according to the embodiment.

FIG. 5 is a view illustrating the configuration of a radio frame used in the LTE system. As illustrated in FIG. 5, the radio frame is formed of 10 subframes in the direction of time. Each subframe is formed of two slots in the direction of time. A length of each subframe is 1 ms, and a length of each slot is 0.5 ms. Each subframe includes a plurality of resource blocks (RBs) in the frequency direction, and includes a plurality of symbols in the direction of time. The resource block (RB) may be also referred to as a physical resource block (PRB). Each RB includes a plurality of sub-carriers in the frequency direction. To be more specific, 1 RB is formed of 12 sub-carriers and 1 slot. One resource element (RE) is formed of 1 symbol and 1 sub-carrier. Out of the radio resources (time and frequency resources) allocated to the UE 100, the frequency resource is specified by the RB, and the time resource is specified by the subframe (or the slot).

(Operation According to Embodiment)

Figure 6:
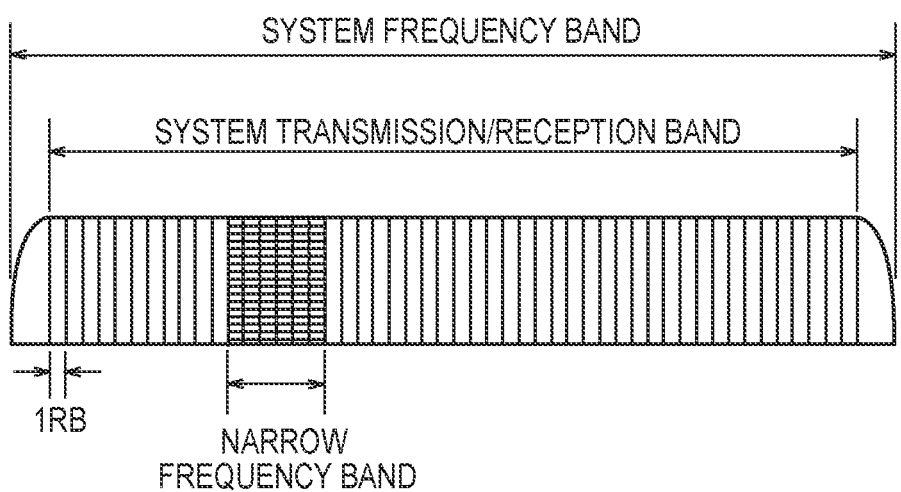
FIG. 6 is a view for describing an operation according to the embodiment.
Figure 7:
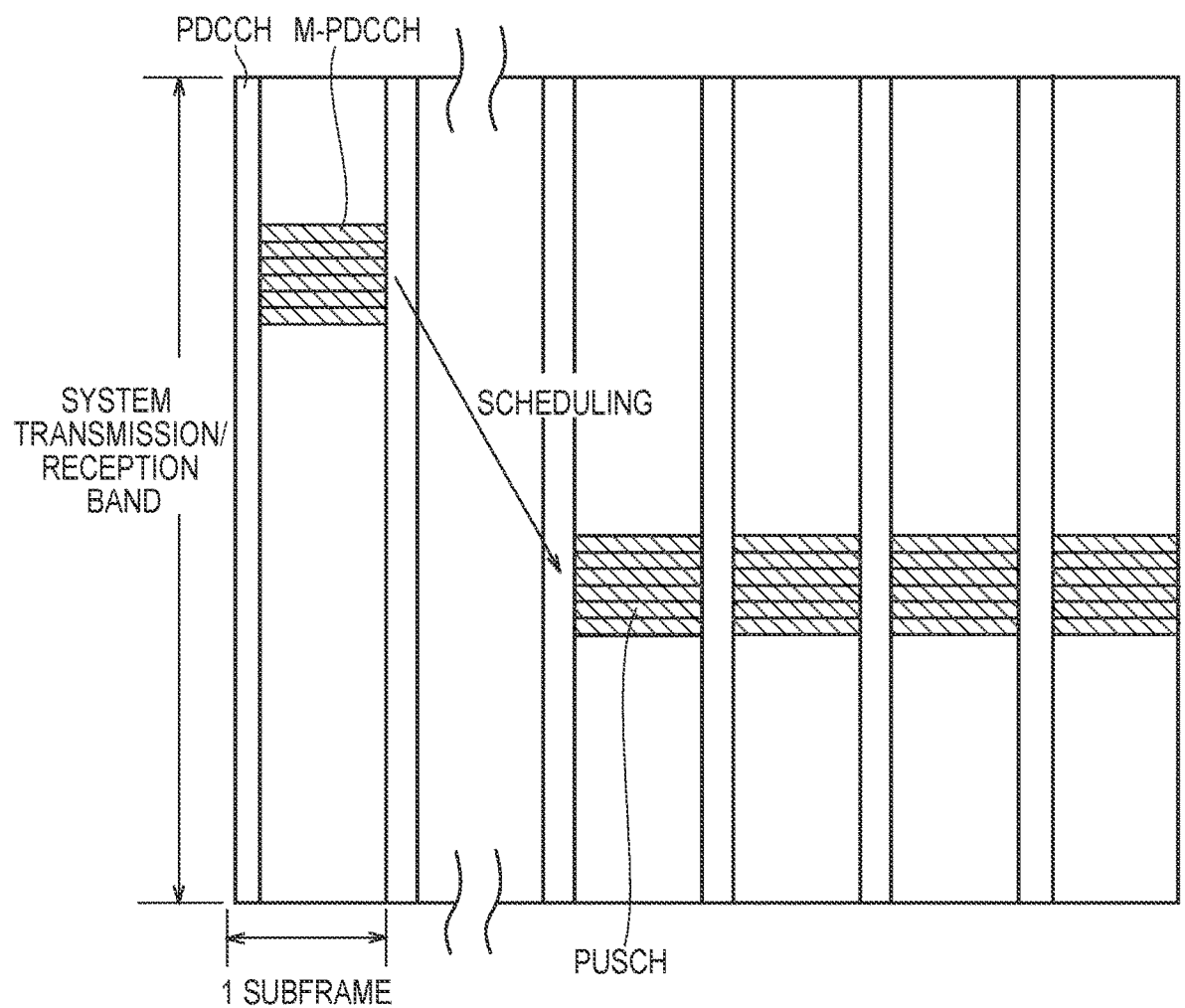
FIG. 7 is a view for describing the operation according to the embodiment.

The operation according to the embodiment is described. FIG. 6 and FIG. 7 are views for describing the operation of the embodiment. Hereinafter, the description will be made mainly with respect to an MTC of the uplink in the LTE system.

As illustrated in FIG. 6, a frequency bandwidth of a system frequency band in the LTE system may be 10 MHz. A bandwidth of a system transmission/reception band is, for example, 50RB=9 MHz. A bandwidth of a narrow frequency band compatible with a UE 100 which corresponds to the MTC (hereinafter referred to as "MTC UE") is 6RB=1.08 MHz, for example. A narrow frequency band is a part of the system transmission/reception band. Hereinafter, a narrow frequency band formed of 6RB is referred to as "NB (Narrow Band)". The MTC is a technique for performing radio communication (MTC) between the MTC UE 100 and the eNB 200 using the NB.

As illustrated in FIG. 7, the MTC UE 100 cannot receive a physical downlink control channel (PDCCH) formed over the entire system transmission/reception band. Accordingly, an M-PDCCH (MTC Physical Downlink Control Channel) which is a PDCCH for the MTC is adopted in place of the PDCCH. The M-PDCCH is used for transmission of control information (DCI: Downlink Control Information) used in the MTC.

In the MTC, repeated transmission is adopted for enhancing reachability of a signal from a transmission side to a reception side. For example, in uplink communication, as illustrated in FIG. 7, transmission of a physical uplink shared channel (PUSCH) is repeated over a plurality of subframes.

Under such a background, there is considered a need for using a MTC not only in a sensor where only data communication having a small capacity is estimated but also in a wearable terminal or the like where data communication having a larger capacity than the sensor is estimated. To satisfy such a need, the increase of throughput in the MTC is desirable. Accordingly, in this embodiment, for increasing throughput in the MTC, a case is estimated where the MTC UE 100 performs uplink communication using a frequency bandwidth wider than a bandwidth of the NB.

Figure 8:
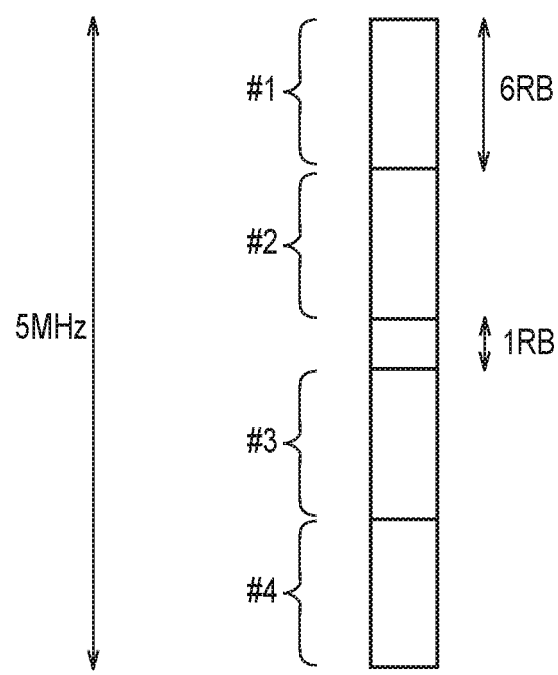
FIG. 8 is a view illustrating a narrow frequency band according to the embodiment.

FIG. 8 is a view illustrating the NBs according to the embodiment. As illustrated in FIG. 8, the MTC UE 100 according to the embodiment is compatible with a bandwidth containing a plurality of NBs. The bandwidth may be 5 MHz. A frequency band of 5 MHz is formed of 25RBs. Since 1NB is formed of 6RB and hence, a frequency band of 5 MHz is formed of 4NBs and 1RB. 1RB exists at a frequency position disposed at the center of the frequency band of 5 MHz. The MTC UE 100 according to the embodiment can use 1RB positioned at the center frequency in uplink communication in addition to the use of at least one NB in the uplink communication. The RBs used in the MTC UE 100 are required to be formed continuously in the uplink communication and hence, 1RB positioned at the center frequency is used in the uplink communication together with NB #2 or NB #3.

The MTC UE 100 according to the embodiment performs uplink communication while switching the NBs by frequency hopping. To be more specific, the MTC UE 100 performs transmission of a PUSCH while switching the NBs at a predetermined cycle.

Figure 9:
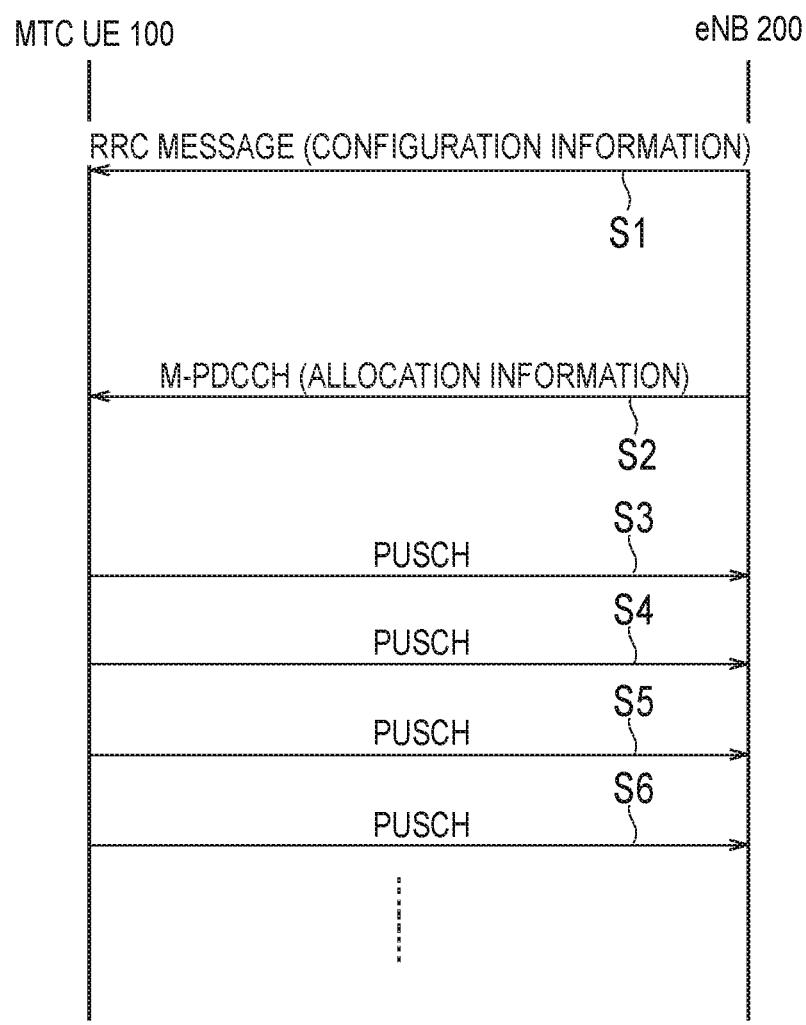
FIG. 9 is a view illustrating an operation sequence according to the embodiment.

FIG. 9 is a view illustrating an operation sequence according to the embodiment. The MTC UE 100 may be in an RRC connected state.

As illustrated in FIG. 9, in step S1, the eNB 200 transmits an RRC message to the MTC UE 100. The RRC message includes configuration information for frequency hopping (hereinafter referred to as "an RRC parameter"). An RRC parameter is information for configuring frequency hopping at an NB unit. The RRC parameter may include a parameter indicating a hopping pattern of frequency hopping and the like. To be more specific, the RRC parameter may include an offset and a hopping interval. The offset is a parameter indicating a differential (an offset) in a frequency direction in each transmission of frequency hopping in terms of NB unit. The hopping interval is a parameter indicating an interval in a direction of time in each transmission of frequency hopping in terms of sub frame unit. In configuring frequency hopping of the PDSCH, the RRC parameter may include a hopping number which is a parameter indicating the number of NBs which becomes a candidate for frequency hopping. As an example, assume a case where the hopping number is 4, an offset is 2, and a hopping interval is 1. In this case, the respective transmissions in frequency hopping are performed in accordance with the following subframes and NBs.

Transmitted at subframe #1:NB #1
Transmitted at subframe #2:NB #3
Transmitted at subframe #3:NB #5
Transmitted at subframe #4:NB #7
Transmitted at subframe #5:NB #1

In this specific example, the case is estimated a case where a frequency bandwidth of 10 MHz is used in place of a frequency bandwidth of 5 MHz illustrated in FIG. 8 as a bandwidth including a plurality of NBs.

As another example, assume a case where the hopping number is 3, the offset is 1, and the hopping interval is 1. The respective transmissions in frequency hopping are performed in accordance with the following subframes and NBs.

Transmitted at subframe #1:NB #1
Transmitted at subframe #2:NB #2
Transmitted at subframe #3:NB #3
Transmitted at subframe #4:NB #1

The RRC message may be a UE individual RRC message (for example, an RRC connection reconfiguration message). The RRC message may further include a parameter indicating a frequency band of 5 MHz. The UE 100 which receives the RRC message stores parameters included in the RRC message.

In step S2, the eNB 200 transmits an M-PDCCH to the MTC UE 100. The M-PDCCH includes allocation information indicating a frequency band of an uplink allocated to the MTC UE 100 from the eNB 200. Such allocation information may be also referred to as an uplink grant. Allocation information is information which indicates NBs and/or RBs allocated to the MTC UE 100 from the eNB 200. Information indicating the NBs and/or the RBs may be indexes of the NBs and/or the RBs, or information indicating the combination or a range of the NBs and/or the RBs. The M-PDCCH includes information indicating the number of times of repeated transmission of the PUSCH. The M-PDCCH includes a hopping flag indicating the start of application of frequency hopping. The MTC UE 100 which receives the M-PDCCH recognizes a frequency band allocated to the MTC UE 100. Further, the MTC UE 100 determines that frequency hopping is applied to the PUSCH transmission based on the hopping flag.

In step S3, the MTC UE 100, after a lapse of a predetermined subframe from a subframe in which MTC UE 100 receives an M-PDCCH, transmits a PUSCH to the eNB 200 using a frequency band allocated to the MTC UE 100. The PUSCH transmission in step S3 is first transmission of frequency hopping. A first frequency band of frequency hopping may be a frequency band explicitly designated in accordance with an M-PDCCH.

In step S4, the MTC UE 100 transmits a PUSCH to the eNB 200 using a frequency band of the hopping destination. The frequency band of the hopping destination is set based on a first frequency band and an RRC parameter. In step S4, data transmitted on the PUSCH may be data equal to data transmitted on the PUSCH in step S3.

In step S5, the MTC UE 100 transmits a PUSCH to the eNB 200 using a frequency band of next hopping destination. With respect to succeeding steps (step S5, step S6, . . . ), the MTC UE 100 performs PUSCH transmission the number of times which corresponds to the number of times of repeated transmission.

In such an operation, an RRC parameter for frequency hopping configures frequency hopping at an NB unit. On the other hand, a fraction RB which is smaller than 1NB (for example, 1RB illustrated in FIG. 8) may be allocated to the MTC UE 100 from the eNB 200. The description will be made with respect to an operation in a case where a fraction RB is allocated to the UE 100 where frequency hopping of a PUSCH is configured. Table 1 indicates a pattern where a fraction RB is allocated with respect to first allocation of a PUSCH (Initial) and allocation of hopping destination (hopping).

TABLE 1

|  | RB allocation (Initial) | RB allocation (hopping) |
| --- | --- | --- |
| Pattern 1 | Fraction RB present | Fraction RB present |
| Pattern 2 | Fraction RB present | Fraction RB absent |
| Pattern 3 | Fraction RB absent | Fraction RB present |

In the operation pattern 1, the first allocation of the PUSCH and the allocation of the hopping destination (hopping) respectively include the fraction RB.

In the operation pattern 2, the first allocation of PUSCH includes the fraction RB. On the other hand, the allocation of the hopping destination (hopping) does not include the fraction RB.

In the operation pattern 3, the first allocation of the PUSCH does not include the fraction RB. On the other hand, the allocation of the hopping destination (hopping) includes the fraction RB.

Operation Pattern 1

In the operation pattern 1, the eNB 200 performs uplink communication with the MTC UE 100 which uses at least one NB limited to a predetermined RB number (6RB). The transmitter 210 of the eNB 200 transmits configuration information (RRC parameter) for frequency hopping where uplink communication is performed while switching an NB to the MTC UE 100. The controller 230 of the eNB 200 allocates the first frequency band of frequency hopping and a frequency band of the hopping destination to the MTC UE 100. The first frequency band and the frequency band of the hopping destination respectively include at least one NB and a fraction RB. The fraction RB is RBs, the number of which is smaller than a predetermined RB number (6RB). The controller 230 of the eNB 200 makes the number of fraction RBs included in the frequency band of the hopping destination agree with the number of fraction RBs included in the first frequency band.

In this manner, according to the operation pattern 1, a bandwidth of the first frequency band of the frequency hopping and a bandwidth of the frequency band of the hopping destination can be made equal to each other. Accordingly, PHY layer parameters which are respectively applied to the bandwidth of the first frequency band and the bandwidth of the frequency band of the hopping destination can be made equal to each other.

In the operation pattern 1, a fraction RB which the eNB 200 allocates to the MTC UE 100 is positioned adjacently to at least one NB which the eNB 200 allocates to the MTC UE 100. Accordingly, continuity of the RB can be ensured. Further, in the operation pattern 1, the controller 230 of the eNB 200 may allocate an RB to the MTC UE 100 such that the frequency positional relationship between an NB in the frequency band of the hopping destination and the fraction RB and the frequency positional relationship between an NB in the first frequency band and the fraction RB become opposite to each other.

Figure 10:
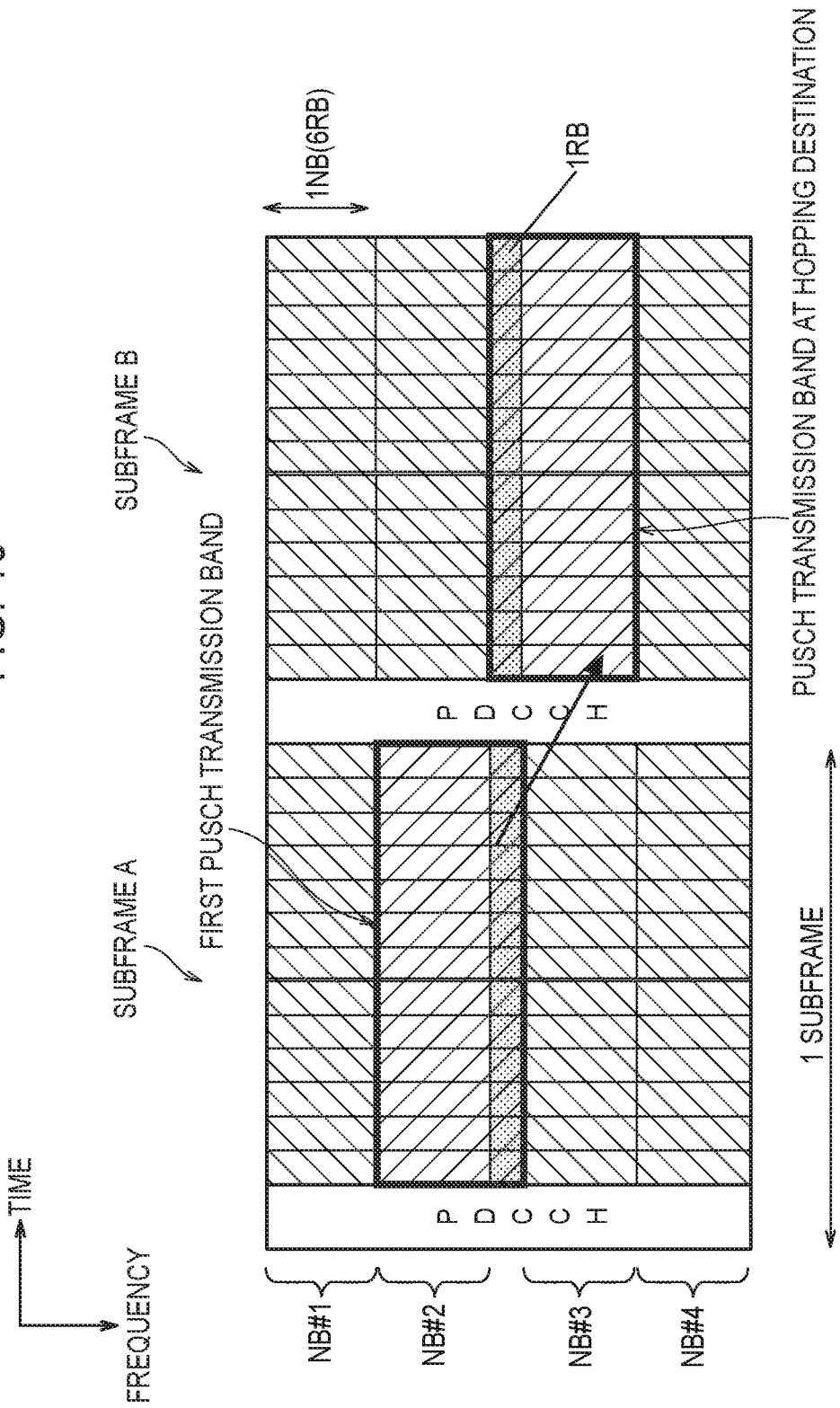
FIG. 10 is a view illustrating an operation pattern 1 according to the embodiment.

FIG. 10 is a view illustrating the operation pattern 1. In FIG. 10, a frequency bandwidth with which the MTC UE 100 is compatible is 5 MHz in the same manner as the frequency bandwidth in FIG. 8.

As illustrated in FIG. 10, the MTC UE 100 performs the first PUSCH transmission in a subframe A, and performs PUSCH transmission at a hopping destination in a next subframe B. A frequency band allocated to the first PUSCH transmission (first PUSCH transmission band) is NB #2 and a fraction RB (1RB). NB #2 is positioned adjacently to the fraction RB (1RB). A frequency band allocated to PUSCH transmission at the hopping destination (the PUSCH transmission band of the hopping destination) is NB #3 and a fraction RB (1RB). NB #3 is positioned adjacently to the RB (1RB) which is a fraction.

In FIG. 10, the frequency positional relationship between an NB and a fraction RB (1RB) is reversed between the first PUSCH transmission band and the PUSCH transmission band of the hopping destination. That is, even when frequency hopping is performed at an NB unit, frequency hopping of a fraction RB (1RB) is not performed. Since the eNB 200 performs such RB allocation, it is possible to effectively make use of the fraction RB (1RB) while ensuring continuity of the RB.

Operation Pattern 2

The operation pattern 2 is described mainly with respect to the difference between the operation pattern 2 and the operation pattern 1. In the operation pattern 2, the MTC UE 100 performs uplink communication with the eNB 200 using at least one NB limited to a predetermined RB number. The receiver 110 of the MTC UE 100 receives configuration information (RRC parameter) for frequency hopping where uplink communication is performed while switching an NB, and allocation information relating to allocation of a first frequency band of frequency hopping and a frequency band of a hopping destination from the eNB 200. The controller 130 of the MTC UE 100 controls uplink communication which uses frequency hopping based on configuration information and allocation information. The first frequency band and the frequency band of the hopping destination respectively include at least one NB allocated from the eNB 200. The first frequency band further includes a fraction RB allocated from the eNB 200. The controller 130 of the MTC UE 100 decides whether or not a fraction RB is to be used in uplink communication with respect to the frequency band of the hopping destination. In the same manner as the operation pattern 1, the fraction RB is an RB positioned adjacently to the NB.

The controller 130 of the MTC UE 100 decides whether or not a fraction RB is to be used in uplink communication with respect to a frequency band of the hopping destination based on a preset rule. For example, when the first frequency band includes a fraction RB, the controller 130 of the MTC UE 100 may determine that the fraction RB is allocated with respect to a frequency band of the hopping destination even when the fraction RB is not explicitly allocated to the frequency band of the hopping destination. Alternatively, when the first frequency band includes a fraction RB and the frequency band of the hopping destination does not include a fraction RB, the controller 130 of the MTC UE 100 may determine that the fraction RB is not allocated with respect to the frequency band of the hopping destination.

The controller 130 of the MTC UE 100 decides whether or not a fraction RB is to be used in uplink communication with respect to the frequency band of the hopping destination based on notification from the eNB 200. In this case, the receiver 110 of the MTC UE 100 receives notification information indicating whether or not a fraction RB is to be used in uplink communication with respect to the frequency band of the hopping destination from the eNB 200. Based on the notification information, the controller 130 of the MTC UE 100 decides whether or not a fraction RB is to be used in uplink communication with respect to the frequency band of the hopping destination. The notification information may be transmitted in the form of an RRC message (step S1 in FIG. 9) or may be transmitted in the form of an M-PDCCH (step S2 in FIG. 9).

When the preset rule is used, notification from the eNB 200 becomes unnecessary and hence, signaling can be reduced. On the other hand, when notification from the eNB 200 is used, the eNB 200 can control whether or not a fraction RB is to be used in uplink communication with respect to the frequency band of the hopping destination.

Next, an operation when a fraction RB is not used at the hopping destination and an operation when a fraction RB is used at the hopping destination are described respectively.

Figure 11:
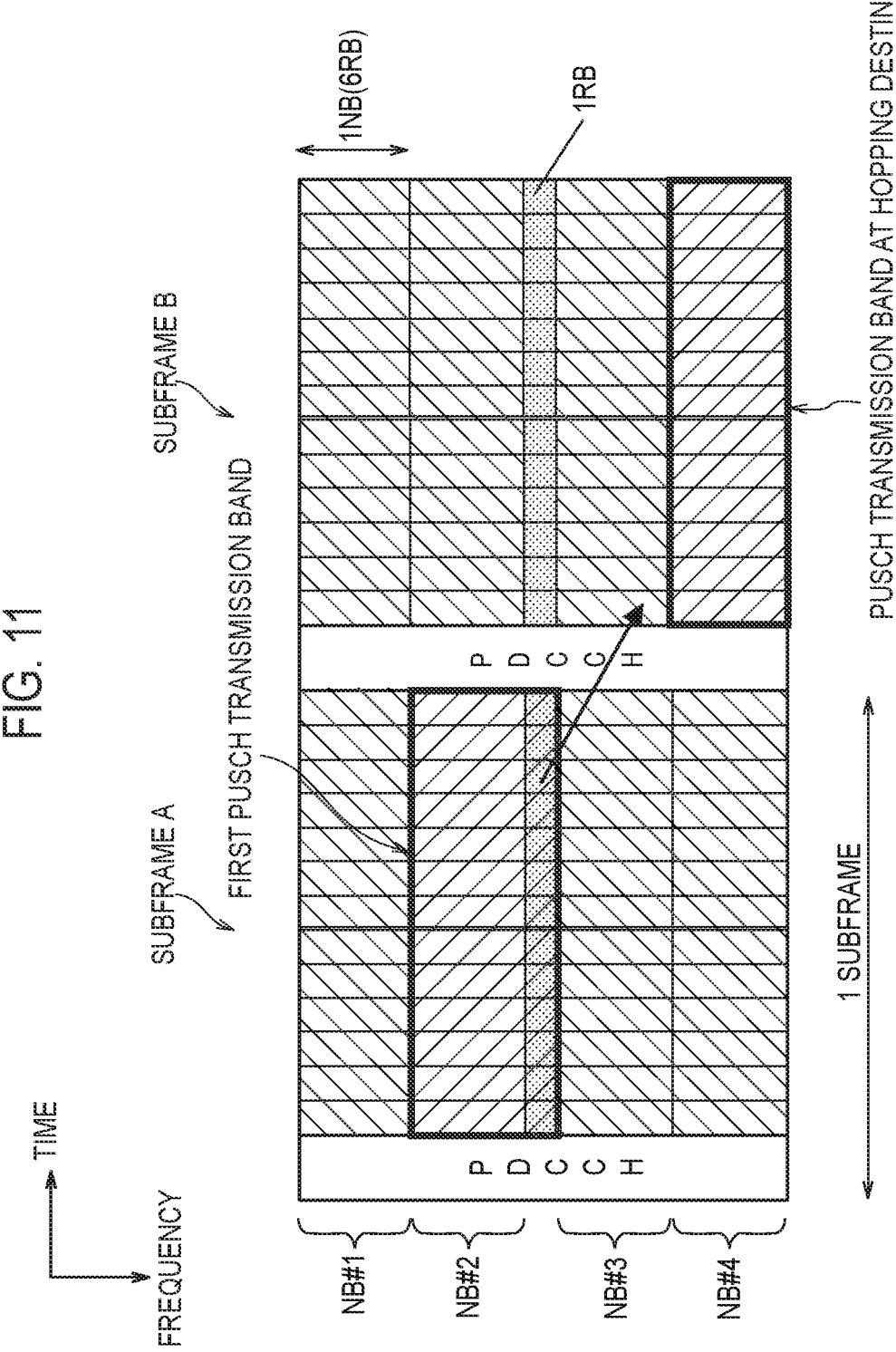
FIG. 11 is a view illustrating an operation in a case where a fraction resource block is not used at a hopping destination in an operation pattern 2 according to the embodiment.

FIG. 11 is a view illustrating the operation when a fraction RB is not used in the hopping destination in the operation pattern 2.

As illustrated in FIG. 11, the MTC UE 100 performs first PUSCH transmission in a subframe A and, next, performs PUSCH transmission at the hopping destination in a next subframe B. A frequency band allocated to the first PUSCH transmission (first PUSCH transmission band) is an NB #2 and a fraction RB (1RB). The NB #2 is positioned adjacently to the fraction RB (1RB). A frequency band allocated to the PUSCH transmission at the hopping destination (the PUSCH transmission band of the hopping destination) is NB #4.

In this manner, when the fraction RB is not used at the hopping destination, the RB number of the first PUSCH transmission band and the RB number of the PUSCH transmission band of the hopping destination do not agree with each other. To be more specific, the RB number of the first PUSCH transmission band is larger than the RB number of the PUSCH transmission band of the hopping destination by an amount of a fraction RB. In this case, the RB number is linked with a transport block size (TBS) and hence, it is necessary to decide the TBS by taking into account the difference in RB number.

The controller 130 of the MTC UE 100 applies the TBS which corresponds to the RB number of the PUSCH transmission band of the hopping destination to both of the first PUSCH transmission band and the PUSCH transmission band of the hopping destination. In this case, the RB number of the PUSCH transmission band of the hopping destination is the RB number from which a fraction RB is excluded. That is, the controller 130 of the MTC UE 100 decides the TBS corresponding to the RB number from which the fraction RB is excluded, and applies the decided TBS to both of the first PUSCH transmission and the PUSCH transmission at the hopping destination. On the other hand, the controller 130 of the MTC UE 100 sets a coding rate applied to the first PUSCH transmission lower than a coding rate applied to the PUSCH transmission at the hopping destination. In other words, an amount of redundancy bits added to a transport block transmitted in accordance with the first PUSCH is increased compared to an amount of redundancy bits added to a transport block transmitted in accordance with a PUSCH at the hopping destination. The first PUSCH transmission and the PUSCH transmission at the hopping destination may adopt the same modulation system (modulation order).

Alternatively, the controller 130 of the MTC UE 100 may apply the TBS used in the first PUSCH transmission band to both of the first PUSCH transmission band and the PUSCH transmission band of the hopping destination. In this case, the eNB 200 decides an MCS such that the TBS becomes a TBS within a range where the TBS can be transmitted at the RB number of the PUSCH transmission band of the hopping destination (having no fraction RB) at the time of allocating the PUSCH, and notifies the decided MCS to the UE 100 in the form of an MPDCCH.

Figure 12:
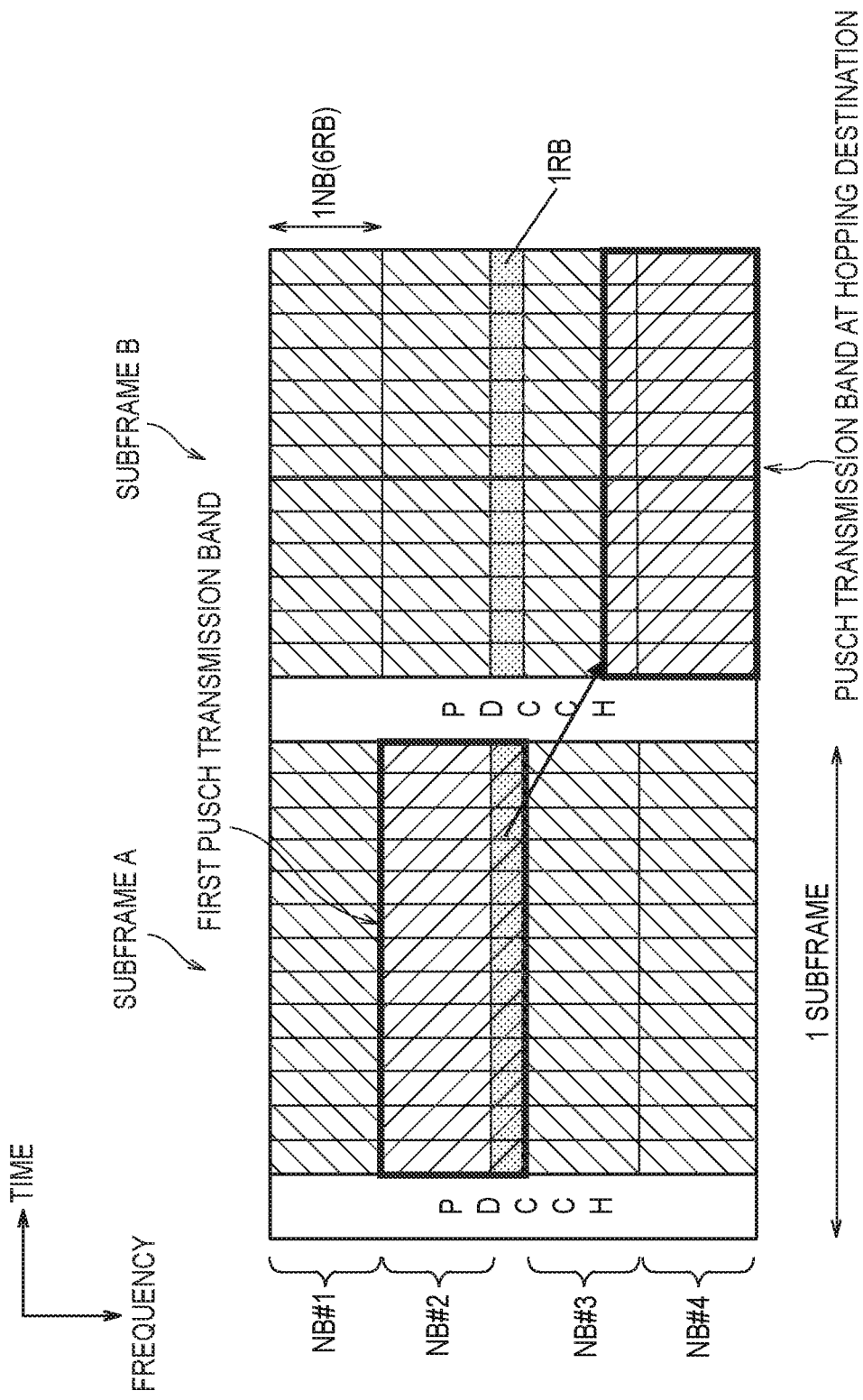
FIG. 12 is a view illustrating an operation in a case where the fraction resource block is used at the hopping destination in the operation pattern 2 according to the embodiment.

FIG. 12 is a view illustrating an operation when a fraction RB is used at the hopping destination in the operation pattern 2.

As illustrated in FIG. 12, the controller 130 of the MTC UE 100 expands the PUSCH transmission band of the hopping destination by an amount of a fraction RB in a specified frequency direction. A frequency band allocated to the first PUSCH transmission (first PUSCH transmission band) is an NB #2 and a fraction RB (1RB). Although a frequency band allocated to the PUSCH transmission at the hopping destination (a PUSCH transmission band of the hopping destination) is NB #4, the PUSCH transmission band of the hopping destination is expanded by the fraction RB (1RB). In FIG. 12, one example where the PUSCH transmission band is expanded in a low frequency direction is illustrated. The eNB 200 may instruct the MTC UE 100 whether the PUSCH transmission band is to be expanded in the low frequency direction or in the high frequency direction. Such an instruction may be transmitted in the form of an RRC message or in the form of an M-PDCCH. When a fraction RB is used at the hopping destination, the RB number in the first PUSCH transmission band and the RB number in the PUSCH transmission band of the hopping destination agree with each other and hence, it is unnecessary to take into account the difference in RB number.

Operation Pattern 3

The operation pattern 3 is described mainly with respect to a point which makes the operation pattern 3 different from the operation pattern 2. In the operation pattern 3, a first frequency band and a frequency band of a hopping destination respectively include an NB allocated from the eNB 200. The frequency band of the hopping destination further includes a fraction RB allocated from the eNB 200. The MTC UE 100 (controller 130) determines whether or not the fraction RB is to be used in uplink communication with respect to the first frequency band.

The controller 130 of the MTC UE 100 decides whether or not the fraction RB is to be used in the uplink communication with respect to the first frequency band based on the preset rule. For example, when the frequency band of the hopping destination includes the fraction RB, the controller 130 of the MTC UE 100 may determine that the fraction RB is allocated with respect to the first frequency band even when the fraction RB is not explicitly allocated to the first frequency band. Alternatively, when the frequency band of the hopping destination includes the fraction RB and the first frequency band does not include the fraction RB, the controller 130 of the MTC UE 100 may determine that the fraction RB is not allocated with respect to the first frequency band.

Further, the controller 130 of the MTC UE 100 decides whether or not the fraction RB is to be used in uplink communication with respect to the first frequency band based on notification from the eNB 200. In this case, the receiver 110 of the MTC UE 100 receives notification information indicating whether or not the fraction RB is to be used in uplink communication with respect to the first frequency band from the eNB 200. Based on the notification information, the controller 130 of the MTC UE 100 decides whether or not the fraction RB is to be used in uplink communication with respect to the first frequency band based on the notification information. The notification information may be transmitted in the form of an RRC message (step S1 in FIG. 9), or may be transmitted in the form of in the M-PDCCH (step S2 in FIG. 9).

Next, an operation when a fraction RB is not used in the first PUSCH transmission and an operation when a fraction RB is used in the first PUSCH transmission are described respectively.

Figure 13:
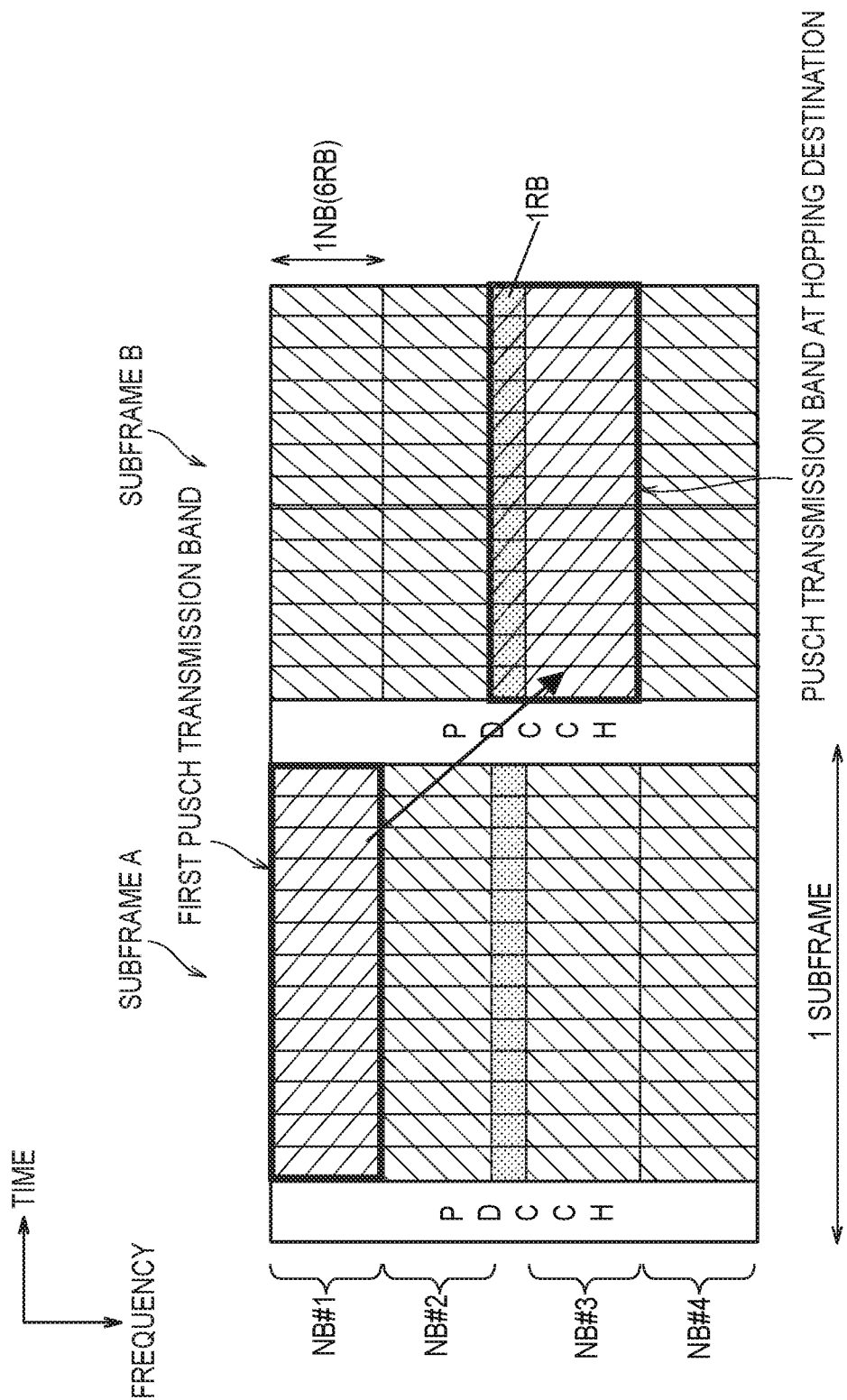
FIG. 13 is a view illustrating an operation in a case where an RB of a fraction is not used in first PUSCH transmission in an operation pattern 3.

FIG. 13 is a view illustrating the operation of the case where a fraction RB is not used in the first PUSCH transmission in the operation pattern 3.

As illustrated in FIG. 13, the MTC UE 100 performs the first PUSCH transmission in a subframe A, and performs the PUSCH transmission at the hopping destination in the next subframe B. A frequency band allocated to the first PUSCH transmission (first PUSCH transmission band) is an NB #1. A frequency band allocated to the PUSCH transmission at the hopping destination (the PUSCH transmission band of the hopping destination) is an NB #3 and a fraction RB (1RB). The NB #3 is positioned adjacently to the fraction RB (1RB).

In this manner, when the fraction RB is not used in the first PUSCH transmission, the RB number in the first PUSCH transmission band and the RB number in the PUSCH transmission band of the hopping destination do not agree with each other. The controller 130 of the MTC UE 100 adopts a TBS which corresponds to the RB number of the first PUSCH transmission band in both of the first PUSCH transmission band and the PUSCH transmission band of the hopping destination. In this case, the RB number in the first PUSCH transmission band is an RB number from which a fraction RB is excluded. That is, the controller 130 of the MTC UE 100 decides a TBS which corresponds to the RB number from which the fraction RB is excluded, and adopts the decided TBS in both of the first PUSCH transmission and the PUSCH transmission at the hopping destination. The controller 130 of the MTC UE 100 sets a coding ratio which the first PUSCH transmission adopts lower than a coding ratio which the PUSCH transmission at the hopping destination adopts. The first PUSCH transmission and the PUSCH transmission at the hopping destination may adopt the same modulation method (modulation order).

On the other hand, when a fraction RB is used in the first PUSCH transmission, the controller 130 of the MTC UE 100 expands the first PUSCH transmission band in a specified frequency direction by an amount of the fraction RB. The eNB 200 may instruct the MTC UE 100 whether the first PUSCH transmission band is to be expanded in a low frequency direction or in a high frequency direction. Such an instruction may be transmitted in the form of an RRC message or in the form of an M-PDCCH. When a fraction RB is used in the first PUSCH transmission, the RB number in the first PUSCH transmission band and the RB number in the PUSCH transmission band of the hopping destination agree with each other and hence, it is unnecessary to take into account the difference in RB number.

Other operation examples in the operation pattern 3 are described. In the MTC UE 100, a fraction RB is not allocated from the eNB 200 to the first PUSCH transmission, and the fraction number RB is allocated from the eNB 200 to PUSCH transmission at the hopping destination. On the premise of such a configuration, the controller 130 of the MTC UE 100 reduces RBs in use in the NB by an amount of the fraction RB at the time of performing the PUSCH transmission at the hopping destination.

As an example, assume a case where 2NB (12RB) is allocated to the first PUSCH transmission, and the 2NB (12RB) and a fraction RB (1RB) sandwiched between the 2NB are allocated to the PUSCH transmission at the hopping destination. To be more specific, in the example illustrated in FIG. 8, assume a case where NB #2, NB #3 and a fraction RB (1RB) are allocated to the PUSCH transmission at the hopping destination. In such a case, the controller 130 of the MTC UE 100 does not use 1RB which is positioned at an end portion of NB #2 in a frequency direction and is not positioned adjacently to the fraction RB in the PUSCH transmission when the PUSCH transmission at the hopping destination is performed. In the example illustrated in FIG. 8, the uppermost RB in the NB #2 is not used in the PUSCH transmission. Alternatively, the controller 130 of the MTC UE 100 does not use 1RB which is positioned at an end portion of NB #3 in a frequency direction and is not positioned adjacently to the fraction RB in the PUSCH transmission when the PUSCH transmission at the hopping destination is performed. In the example illustrated in FIG. 8, the lowermost RB in the NB #3 is not used in the PUSCH transmission. Such operations may be constantly performed in the operation pattern 3. Alternatively, such operations may be adopted in the operation pattern 3 exclusively in the case where the allocated RB number (the RB number including a fraction RB) in the PUSCH transmission at the hopping destination does not reach the predetermined number.

In this manner, by reducing the RBs in use in the NB by an amount of a fraction RB in the operation pattern 3, the RB number can be set to the same number 12 between the first PUSCH transmission and the PUSCH transmission at the hopping destination while ensuring continuity of the RB.

In the PUSCH transmission at the hopping destination, RB which is not used in the PUSCH transmission (that is, RB to be reduced) may be decided based on a preset rule (for example, a rule where RB having the lowest frequency or RB having the highest frequency among allocated RBs in the NB is not used). Alternatively, the RB to be reduced may be explicitly designated from the eNB 200 to the UE 100. Such designation may be either dynamic designation or static designation.

(Modification)

With respect to the operation patterns 2 and 3, one example has been described where the TBS is decided corresponding to the RB number from which a fraction RB is excluded, and the decided TBS is adopted by both of the first PUSCH transmission and the PUSCH transmission at the hopping destination. Such a TBS decision method can be also used in the operation pattern 1. That is, the TBS may be decided corresponding to the RB number from which a fraction RB is excluded in a case where allocation in the first PUSCH transmission includes the fraction RB and the allocation in the PUSCH transmission at the hopping destination also include the fraction RB.

A fraction RB may not be counted in the number at the time of calculating the TBS regardless of the presence or the absence of a neighboring fraction RB.

OTHER EMBODIMENTS

In the embodiment, a scenario where allocation is made in terms of an NB unit is mainly estimated. However, a scenario may be estimated where only some RBs in the NB are used. For example, in a case where 2NBs are used within 1 subframe time, a scenario may be estimated where 8RBs in total is transmitted using RBs #3, 4, 5, 6 in the first NB and RBs #1, 2, 3, 4 in the second NB. Further, in such a scenario, 9RBs are transmitted when a fraction number RB is included between the first NB and the second NB. In these scenarios, it is necessary to read "NB and a fraction RB are positioned adjacently to each other" as "the RB which is actually allocated in the NB and the fraction RB are positioned adjacently to each other".

In the embodiment, firstly, the first UE to which a fraction RB is not allocated (for example, the UE to which the 6RB is allocated) may decide a hopping destination resource of its own (first UE) such that a hopping destination resource which the second UE to which the fraction RB is allocated (for example, the UE to which the 7RB is allocated) uses is not selected in a frequency direction. In such a hopping control, a rule for calculating the hopping destination resource may be changed in response to the presence or the absence of execution of allocation of the fraction RB. The eNB 200 may notify the first UE whether or not the fraction RB is allocated (or a change in a resource calculation rule) to (other) UEs. The notification may be also transmitted in the form of EPDCCH.

In the embodiment, the description has been made mainly with respect to the case where the MTC is uplink communication. However, the embodiment is not limited to such a case. The embodiment is also applicable to a case where the MTC is downlink communication. For example, operations according to the embodiment may be applied to frequency hopping of a physical downlink shared channel (PDSCH).

In the embodiment, the description has been made mainly with respect to unicast transmission. However, the operations according to the embodiment may be applied to multicast/broadcast transmission. For example, the operations according to the embodiment may be applied to an SC-PTM where multicast transmission is performed using a PDSCH.

Although not specifically described in the embodiment, programs may be provided for allowing a computer to perform various processing which the MTC UE 100 and the eNB 200 perform. The programs may be recorded in a computer readable medium. The programs can be installed in the computer using the computer readable medium. The computer readable medium in which the programs are recorded may be a nonvolatile recording medium. Although the nonvolatile recording medium may not be particularly limited, the nonvolatile recording medium may be a recording medium such as a CD-ROM or a DVD-ROM.

Alternatively, a chip set may be provided where the chip set is formed of: a memory which stores programs for executing various processing which the MTC UE 100 and the eNB 200 perform; and a processor which executes the programs stored in the memory.

In the embodiment, the LTE system has been described as one example of a mobile communication system. However, the embodiment is not limited to the LTE system. The mobile communication system may be a system other than the LTE system.

(Note 1)

(Preface)

In RANP #72, approved is a further reinforced MTC for an LTE WI which includes a task for supporting a data rate higher than 1 Mbps for a voice compatible wearable device and a health monitoring device. In this specification, inventors of the present invention study problems still remaining in frequency hopping which requires a larger maximum bandwidth for acquiring a higher data rate.

The agreement was made on the following in RAN1 conference.

Agreed:

A PDSCH allocation to a FeMTC UE which supports a larger BW is limited to a resource block which is a part of a narrowband defined by a LTE release 13 with respect to a UE configured with a 5 MHz maximum PDSCH channel bandwidth.

24 PRBs is the maximum number of PRBs which can be allocated.

The PDSCH allocation to a FeMTC UE which supports a larger BW is limited to resource blocks which form a part of a narrowband prescribed in the LTE release 13 with respect to a UE configured by a largest PDSCH channel bandwidth of 20 MHz.

96 PRBs is the maximum number of PRBs which can be allocated.

PUSCH allocation to the FeMTC UE having a larger BW may contain at least fixed PRBs which do not form a part of the narrowband described in the LTE release 13.

The PUSCH allocation includes at least the PRB at the center in case of an odd-number system bandwidth.

Task to be studied in future: PRB in band end which does not belong to any narrowband Agreed:

With respect to a Rel-14 BL/CE UE configured with a PDSCH channel bandwidth having 5 MHz at maximum, continuous and non-continuous resource allocations are supported.

Agreed:

With respect to a BL/CE UE operated with a PDSCH/PUSCH channel bandwidth having 5 MHz at maximum, PDSCH/PUSCH frequency hopping is supported.

Rel-13 frequency hopping RRC parameter is reused.

Task to be studied in future: Handling of center PRB in odd-number system bandwidth Task to be studied in future: Possibility of occurrence of wrapping around A guarantee that a frequency hopping error case accompanied with wrapping around (with respect to a PUSCH or a PDSCH having a smaller UE bandwidth than a system bandwidth, for example) does not occur depends on mounting of an eNB.

This does not interrupt the designation of the behavior of the UE with respect to these cases.

The use of PDSCH/PUSCH frequency hopping can be dynamically allowed or prohibited in a CE mode A via a DCI.

(Reaming Problem of Frequency Hopping)

Frequency hopping at a higher data rate is agreed, and a Rel-13 frequency hopping RRC parameter is reused. The RRC parameter has a hopping offset and a hopping interval. When a frequency hopping flag during a DCI is in an ON state, hopping set using the RRC parameter is applied. Resource allocation of the frequency hopping is based on initial resource allocation instructed by the DCI.

With respect to PDSCH frequency hopping, resource allocation of a PDSCH is merely positioned within Rel-13NBs (narrowband) and hence, when Rel-13 frequency hopping follows a conventional RRC parameter, there arises no problem except for wrapping around. On the other hand, with respect to a PUSCH, the agreement was made that at least a PRB at the center which does not form a part of Rel-13 is supported. However, how to handle an RB at the center which does not form a part of an NB has not been decided. The PRB which does not form a part of the NB depends on a system bandwidth described in the following Table 2, and the following Table 3 describes how the state is divided into three cases.

TABLE 2

(Number of PRBs which do not form a part of Rel-13 resource allocation)

| system bandwidth | Total number of 6 PRB narrowbands | Number of PRBs which do not form a part of NB in Rel-13 | | |
|---|---|---|---|---|
| | | End (high) | Center | End (low) |
| 1.4 Mhz, 6 PRB | 1 NB = 6 PRB | 0 | 0 | 0 |
| 3 MHz, 15 PRB | 2 NB = 12 PRB | 1 | 1 | 1 |
| 5 MHz, 25 PRB | 4 NB = 24 PRB | 0 | 1 | 0 |
| 10 MHz, 50 PRB | 8 NB = 48 PRB | 1 | 0 | 1 |
| 15 MHz, 75 PRB | 12 NB = 72 PRB | 1 | 1 | 1 |
| 20 MHz, 100 PRB | 16 NB = 96 PRB | 2 | 0 | 2 |

TABLE 3

(Case on the number of PRBs which do not form a part of NB between initial resource allocation and allocation after frequency hopping)

| | Including PRB which does not form a part of NB or including PRB locating adjacently to the PRB | |
|---|---|---|
| | initial | frequency hopping |
| Case 1 | 1(/2) | 1(/2) |
| Case 2 | 1(/2) | 0 |
| Case 3 | 0 | 1(/2) |

The case 1 means that initial resource allocation includes PRB which does not form a part of Rel-13NB and PRB positioned adjacently to the PRB, and resource allocation after frequency hopping includes PRB which does not form a part of Rel-13NB or the PRB positioned adjacently to the PRB in the same manner. In this case, the UE has a chance of making use of both PRBs without additional instruction. However, the resource allocation after the frequency hopping is slightly changed from resource allocation instructed by the DCI.

Proposal 1: When the initial resource allocation includes the PRB which does not form a part of the Rel-13NB, the PRB which does not form a part of the Rel-13NB should be used for resource allocation after frequency hopping.

With respect to the case 2 and the case 3, only one of the initial resource allocation and the resource allocation after the frequency hopping does not have the PRB which does not form a part of the Rel-13NB. Accordingly, how to handle the PRB which does not form a part of the Rel-13NB should be decided. Inventors of the present invention propose the following two methods:

(1) PRB expansion in Rel-13NB
(2) The number of PRBs is adjusted in response to a presence of a PRB which does not form a part of an NB but is included in initial resource allocation or a PRB positioned adjacently to the PRB.

(1. PRB Expansion in Rel-13NB)

Figure 14:
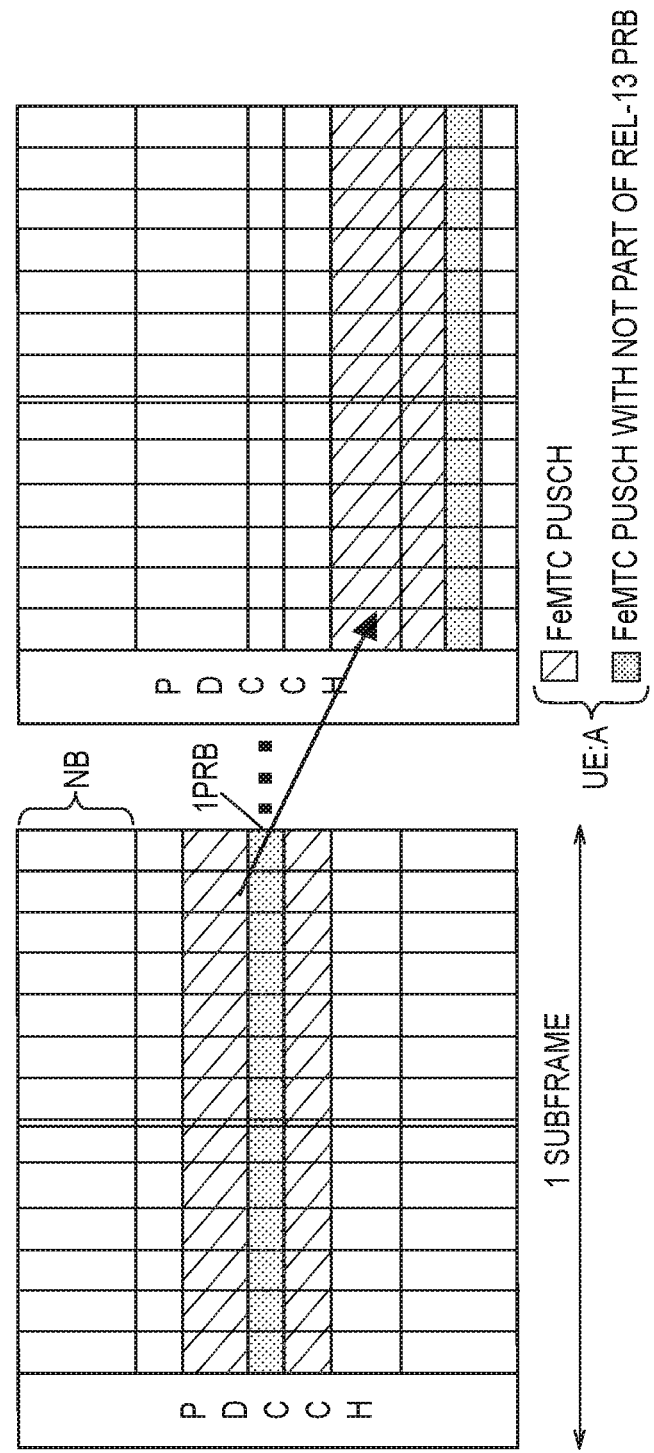
FIG. 14 is a view illustrating an example of PRB expansion in a Rel-13NB according to a note 1.

As illustrated in FIG. 14 described hereinafter, the initial resource allocation has a PRB which does not form a part of the Rel-13NB, and resource allocation after frequency hopping expands a PRB in the NB in place of the PRB which does not form a part of the Rel-13NB. According to this method, even when the PRB which does not form a part of the Rel-13NB does not exist, the number of PRBs can be maintained between the initial resource allocation and the resource allocation after the frequency hopping. However, there is a possibility that overlapping occurs between the Rel-13eMTC UE and another Rel-14FeMTC UE in the expanded PRBs. To avoid such overlapping, it is necessary to take into account such resource allocation at the time of transmitting the UL permission. This method can maintain the number of PRBs with respect to the FeMTC. On the other hand, to avoid such overlapping, resource allocation to the Rel-13FeMTC UE and another Rel-14FeMTC UE is slightly limited.

(2. The Number of PRBs is Adjusted in Response to a Presence of a PRB which does not Form a Part of an NB but is Included in Initial Resource Allocation or a PRB Positioned Adjacently to the PRB.)

Figure 15:
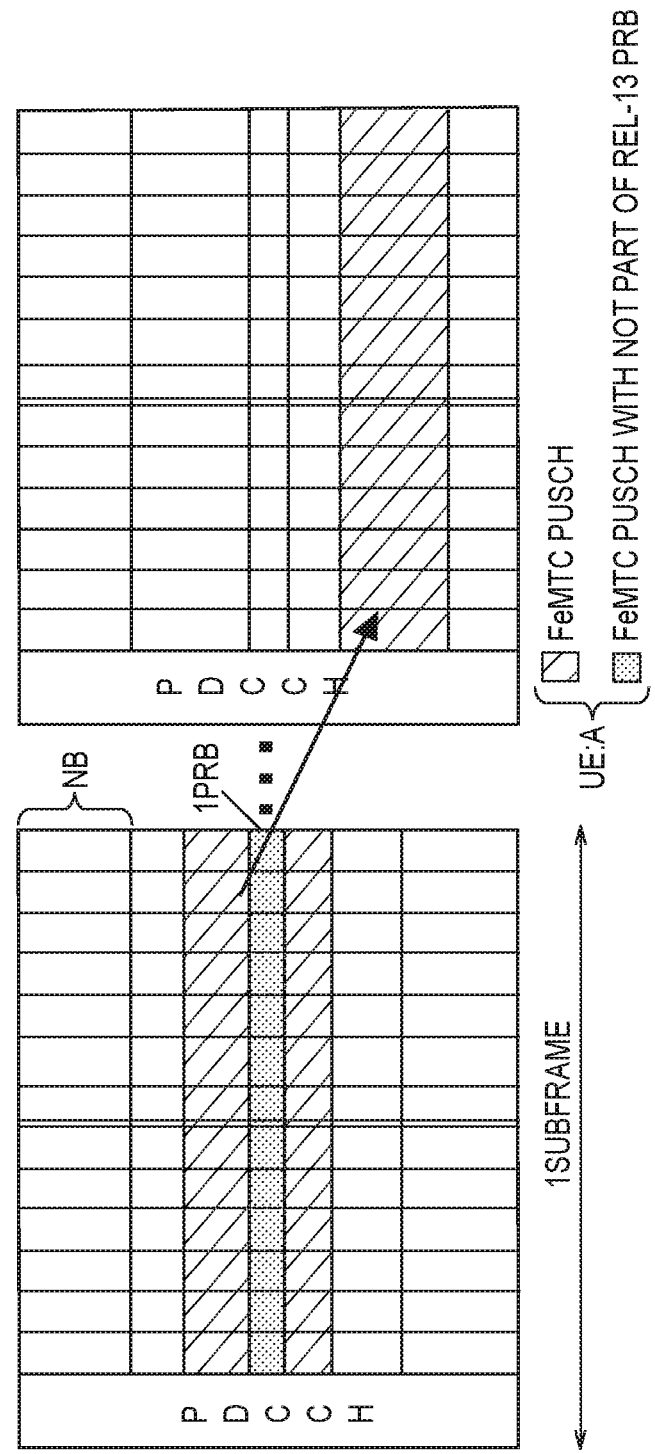
FIG. 15 is a view illustrating an example where the number of PRB according to the note 1 is adjusted.

As illustrated in FIG. 15, in the second method, when one of the resource allocations does not include a PRB which does not form a part of an NB, the PRB which does not form a part of the NB is adopted. For example, the initial resource allocation has 8 PRBs in the NB and 1 PRB (center (/end)) which does not form a part of the Rel-13NB, while the resource allocation after frequency hopping has only 8 PRBs in the NB. In this case, a using method of the PRBs in the NB does not change during hopping and hence, overlapping does not occur. On the other hand, the number of PRBs differs between an initial state and a frequency hopping state and hence, it is necessary for the inventors of the present invention to take into account how a TBS format/size is to be decided. One of the simplest methods is a method where the UE merely uses the number of the PRBs in the initial resource allocation, and the same TBS is used with respect to the transmission after frequency hopping even when the number of PRBs changes. On the other hand, it is necessary to adjust a coding rate for the subsequent transmission which is performed using the different number of PRBs and hence, there is a concern that this method has a potential problem. However, this problem can be solved using an eNB scheduler (by adjusting an MCS index, for example). Further, it is necessary to set the number of PRBs to be allocated to 2a*3b*5c with respect to both resource allocations consisting of resource allocation in an initial state and resource allocation after frequency hopping and hence, it is necessary for the eNB to pay attention on the number of PRBs to be allocated.

To compare two methods, the PRB expansion in Rel-13NB may lower system efficiency because of the restriction imposed on scheduling for avoiding a collision. On the other hand, the second method can adjust a coding rate without affecting a conventional eMTC UE. Accordingly, the inventors of the present invention prefer that the second method is adopted in the Rel-14. From other point of view, it is not yet decided whether or not the PRB positioned at the end which does not form a part of the NB is to be supported. However, the second method is applicable to the case where the PRB at the end is supported for FeMTC transmission in the same manner.

Proposal 2: When the number of PRBs differs between initial resource allocation and frequency hopping resource allocation, the number of PRBs is adjusted in response to the presence of a PRB which does not form a part of an NB but is included in the resource allocation or a PRB positioned adjacently to the PRB.
(Note 2)
(1. Preface)

An RANP #72 includes a task for supporting a data rate higher than 1 Mbps for a voice compatible wearable device and a health monitoring device. A further reinforced MTC is approved for an LTE WI. In this specification, the inventors of the present invention study assignment of RBs for obtaining a higher data rate.

The followings are agreed in the RAN1 conference:
Agreed:
In the next RAN1 agreement, a maximum channel BW with respect to a PUSCH for a non-BL UE is corrected.
Before correction
A Rel-14 non-BL UE can support a CE mode A in a connection mode which has a maximum PDSCH/PUSCH channel bandwidth of 5 or 20 MHz.
After correction
The Rel-14 non-BL UE can support the CE mode A in a connection mode which has a maximum PDSCH channel bandwidth of 5 or 20 MHz.
The Rel-14 non-BL UE can support the CE mode A in a connection mode which has a maximum PUSCH channel bandwidth of 5 MHz.
The Rel-14 non-BL UE can support a CE mode B in a connection mode which has a maximum PDSCH channel bandwidth of 1.4, 5, or 20 MHz.
The Rel-14 non-BL UE can support the CE mode B in a connection mode which has a maximum PUSCH channel bandwidth of 1.4 MHz.
Agreed:
In the PDSCH allocation to a FeMTC UE which supports a larger BW, resource blocks are limited to resource blocks which form a part of a narrowband prescribed in an LTE release 13 with respect to a UE configured with a maximum PDSCH channel bandwidth of 5 MHz.
24PRB is the maximum number of PRBs which can be allocated.
In the PDSCH allocation to the FeMTC UE which supports a larger BW, resource blocks are limited to resource blocks which form a part of a narrowband prescribed in the LTE release 13 with respect to a UE configured with a maximum PDSCH channel bandwidth of 20 MHz.
96PRB is the maximum number of PRBs to be allocated.
The PUSCH allocation to the FeMTC UE having a larger BW may include at least a fixed PRB which does not form a part of a narrowband prescribed in the LTE release 13.
This means that the PUSCH allocation includes at least the PRB at the center in case of an odd-number system bandwidth.
Task to be studied in future: PRB in band end which does not belong to any narrowband
Agreed:
With respect to a Rel-14 BL/CE UE configured with a PDSCH channel bandwidth having 5 MHz at maximum, continuous and non-continuous resource allocations are supported.
With respect to a Rel-14 non-BL UE configured with a PDSCH channel bandwidth having 20 MHz at maximum, continuous and non-continuous resource allocations are supported.
(2. Problems which Still Remain in Resource Allocation)

In the previous conference, the agreement was made that, in the RAN1, the BL and non-BL UE can support the following bandwidths described in the following Table 4. However, the detail of the resource allocation was not yet decided. It is necessary for the inventors of the present invention to study the resource allocation between a CE mode and a DL/UL mode separately. In this section, the inventors of the present invention have studied their observation with respect to the respective resource allocations one by one.

TABLE 4

(Channel bandwidths in BL/CE UE and non-BL UE)

| | | BL/CE UE | non-BL UE |
|---|---|---|---|
| DL | PDSCH in CE mode A | 5 MHz | 5/20 MHz |
| | PDSCH in CE mode B | 5 MHz | 1.4/5/20 MHz |
| UL | PDSCH in CE mode A | 5 MHz | 5 MHz |
| | PDSCH in CE mode B | | 1.4 MHz |

(2.1. Resource Allocation in BL/CE UE)
(2.1.1. CE Mode A)

In the RAN1 #87, proposals have been made by many enterprises with respect to various candidate resource allocation methods relating to a DL and a UL having a channel bandwidth of 5 MHz. The candidate methods are classified between a distributed type/localized type and an exclusive localized type. The distributed type/localized type means the combination of continuous and non-continuous resource allocations including the non-MTC UE. On the other hand, the exclusive localized type means only the continuous resource allocation. In this section, the inventors of the present invention described our observation share our observation based on the above-mentioned candidate resource allocation method.

(2.1.1.1. PDSCH)

In the RAN1, the agreement was made that "continuous and non-continuous resource allocations are supported with respect to the Rel-14 BL/CE UE configured with a PDSCH channel bandwidth having a maximum channel bandwidth of 5 MHz". Accordingly, the agreement was made on the combination of the distributed type and localized type resource mappings with respect to a PDSCH. A resource allocation method of an exclusive localized type is excluded from candidates. The followings are selective resource allocations corresponding to the continuous and non-continuous resource allocations.

RAN1 #87 proposal
  The resource allocation is supported with respect to a PDSCH having a channel bandwidth larger than 5 MHz in a CE mode A.
  Distributed type/localized type
  Alternative 1: Start narrowband index (or wideband index)+NB bit map+resource allocation within existing narrow band.
  Alternative 2: Start narrowband index (or wideband index)+bit map of RBG within wideband of 5 MHz
  Alternative 3: Wideband index+distributed type allocation based on resource allocation type 2 within wideband (including localized type/distributed type flag)

(Start Narrowband Index or Wideband Index)

Figure 16:
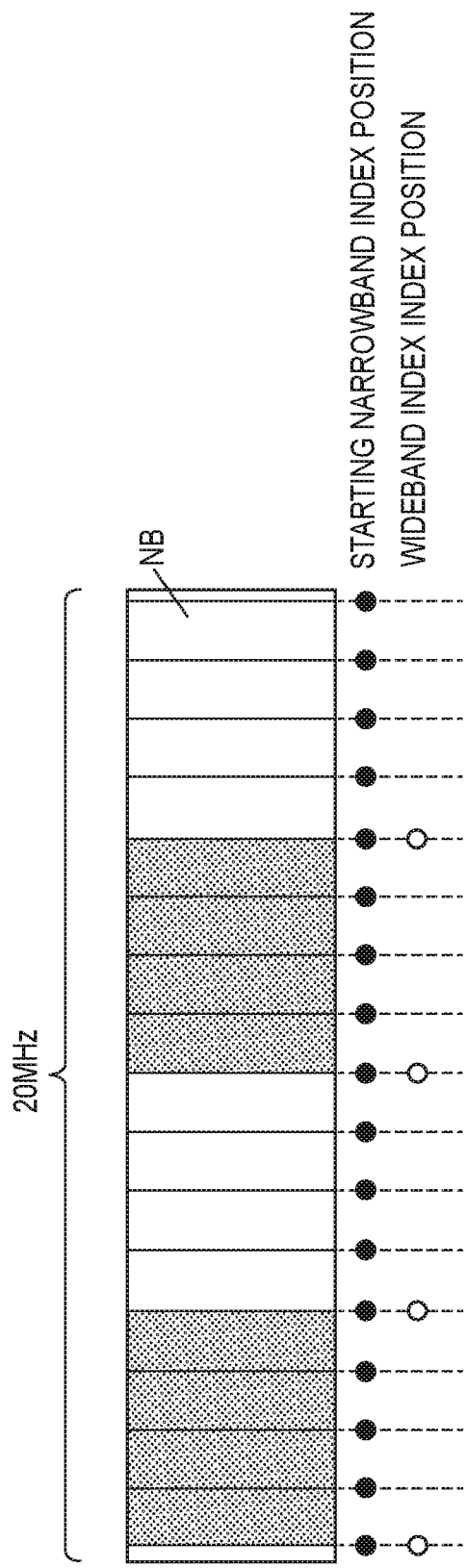
FIG. 16 is a view illustrating a narrowband index and a wideband index in a 20 MHz system bandwidth according to a note 2.

The alternative-1 and the alternative-2 have two types of instructions consisting of a start narrowband index and a wideband index. To compare these two instructions, a tradeoff exists between a bit size and scheduling flexibility. As shown in FIG. 16 described below, the start narrowband index can indicate respective 1.4 MHz. On the other hand, a wideband index can only indicate respective 5 MHz. The narrowband indication granularity provides higher scheduling flexibility than wideband index indication granularity. Accordingly, multiplexing with a conventional UE can be performed more easily and hence, the inventors of the present invention support the start narrowband index.

Proposal 1: In RAN1, a start narrowband index is to be supported for multiplexing with a conventional UE.

Further, in a bandwidth having 5 MHz width or less, the carrier arrangement requires no indexing except for a case where narrowband indexing is used.

Opinion 1: The start narrowband index is used with respect to a system bandwidth having a bandwidth larger than 5 MHz such as 20 MHz.

The inventors of the present invention have studied three alternatives from viewpoints of scheduling flexibility, a bit size, and complexity of multiplexing with a conventional UE.

Alternative-1: Start Narrowband Index+NB Bit Map+Resource Allocation within Existing Narrowband The alternative-1 has higher scheduling flexibility than other two methods when resource allocation within an NB is an instruction for each NB. However, when resource allocation within the NB is instructed for each NB, an overhead bit becomes necessary such as the number of NBs*the resource allocation bit for each NB. Accordingly, the resource allocation within the existing narrowband is to be limited in the alternative-1. For example, to reduce a bit size, with respect to the resource allocation within the existing narrowband, shared resource allocation can be instructed within only one NB or between NBs. However, this limitation lowers scheduling flexibility and hence, resource allocation of UE multiplexing is restricted.

Alternative-2: Start Narrowband Index+Bit Map of RBG in 5 MHz Wideband

The alternative-2 has larger scheduling flexibility than the alternative-1. Further, the alternative-2 can instruct resource allocation within an NB and hence, can easily perform multiplexing with a conventional UE. However, from a viewpoint of a bit size, a bit size of the alternative-2 is slightly larger than a bit size of the alternative-1. For example, in a case where an RBG size is 2 in a 5 MHz system bandwidth, a total bit size is 12 bits. In a case where an RBG size is 3, a total bit size of the alternative-2 is reduced to 8 bits which is smaller than 9 bits of alternative-1.

Alternative-3: Wideband Index+Distributed Type Allocation Based on Resource Allocation Type 2 within Wideband (Including Localized Type/Distributed Type Flag)

The alternative-3 supports distributed type allocation based on the resource allocation type 2. As described previously, scheduling flexibility in a wideband is inferior to scheduling flexibility in narrowband index instruction. From a viewpoint of complexity of UE multiplexing, resource allocation type 2 can form only one gap. Accordingly, the resource allocation type 2 cannot avoid two or more conventional resource allocations. Further, a conventional gap length of a VRB is a fixed value which corresponds to a system bandwidth. When a FeMTC uses a distributed type resource allocation type 2, it is desirable that the fixed value depend on a larger maximum bandwidth (that is, 5 MHz). This fixed gap length is not suitable for multiplexing with a conventional UE. Accordingly, multiplexing with a conventional UE using the alternative-3 is difficult compared to other alternatives. Although the inventors of the present invention support a variable value of a gap length, additional bits for gap instruction become necessary.

The summary of characteristics of these alternatives is described in the following Table 5. To take into account scheduling flexibility, a bit size, and multiplexing, the alternative-2 is most rational. Further, it is desirable that an RBG size be 2 or 3.

Proposal 2: With respect to a PDSCH in a CE mode A, a start narrowband index+a bit map of RBG within a 5 MHz wideband are to be supported. It is desirable that RBG size be 2 or 3.

TABLE 5

(Characteristics of alternatives with respect to PDSCH which uses BL/CE UE in a CE mode A)

|  | Scheduling flexibility | Bit size (5 MHz/20 MHz) | Multiplexing with conventional UE |
|---|---|---|---|
| Alternative-1 (narrow) | High | 9 bits/13 bits *1 | Intermediate |
| Alternative-2 (narrow) | High | RBG = 2:12 bits/16 bits RBG = 3:8 bits/12 bits | High |
| Alternative-3 | Low | 9 bits/11 bits | Low |

*1 Case where only one resource allocation is instructed within existing narrowband (2.1.1.2. PUCCH)

As described in Table 4, the BL/CE UE in a CE mode A supports 5 MHz PUSCH transmission. Further, in the RAN1, the agreement is made that "the PUSCH allocation to a FeMTC UE having a larger BW may include at least fixed PRBs which do not form a part of a narrowband prescribed in the LTE release 13". This agreement means that, 25 PRBs are used with respect to the UL in a 5 MHz system bandwidth for continuous resource allocation and hence, a lower PAPR can be achieved. Accordingly, it is desirable that PUSCH resource allocation adopt continuous mapping with respect to a BL/CE UE in a CE mode A, and the following 5 candidates be listed up in the RAN1 87 with respect to continuous resource allocation.

RAN1 #87 proposal

The continuous resource allocation is supported with respect to a PUSCH having a channel bandwidth larger than 5 MHz in a CE mode A.

Alternative A: Start narrowband index (or wideband index)+existing PUSCH type 0 within 5 MHz wideband Alternative B: Existing PUSCH type 0 (Limited to RIV)

Alternative C: Start RB index+number of RBs

Alternative D: Start narrowband index+number of NBs

Alternative E: Start NB index+number of RBs

Firstly, the existing PUSCH type 0 where the RIV is limited means that the RIV instructs a start RB position which changes from 0 to (system bandwidth−1) and a length limited by 25 PRBs. On the other hand, the alternative-C can instruct the start RB position and the length including a case where a bit size is larger than that of the alternative-B without optimization in the same manner. When the optimization is adopted, the bit size in the alternative-C is equal to the bit size in the alternative-B. Accordingly, the inventors of the present invention assume that the alternative-B and the alternative-C are equal and, hereinafter, the inventors of the present invention take into account only the alternative-B in remaining part of this section.

To compare scheduling flexibility among the above-mentioned five alternatives, a start point and granularity of resource allocation are based on RB granularity and hence, the alternative-B has the highest scheduling flexibility. The alternative-A and the alternative-E can instruct the NB start point+RB based on granularity of the resource allocation. Accordingly, scheduling flexibilities of the alternative-A and the alternative-E are lower than scheduling flexibility of the alternative-B. The alternative-D has granularity based on NBs and hence, the alternative-D has the lowest scheduling flexibility.

From a viewpoint of complexity of multiplexing of the UE with a conventional UE, none of alternatives have a problem. However, the difference exists from a viewpoint of the use of the resource. For example, in the alternative-B, multiplexing with the conventional UE can be realized using the same NBs. However, in the alternative-E, multiplexing with the conventional UE cannot be realized within the start NB. In the alternative-A, although no restriction is imposed on multiplexing with the conventional UE within the start NB, the number of RBs which can be allocated is decreased compared to the alternative-B. In the alternative-D, multiplexing can be made with the conventional UE within resource allocation which is neither the resource allocation of the start NB nor the resource allocation of the finish NB.

To take into account a higher data rate, the alternative-B is most desirable with respect to the BL/CE UE PUSCH in a CE mode A.

Proposal 3: With respect to the PUSCH in a CE mode A, an existing PUSCH type 0 is to be supported.

TABLE 6

(Characteristics of alternatives with respect to PUSCH which uses BL/CE UE in a CE mode A)

|  | Scheduling flexibility | Bit size (5 MHz/20 MHz) | Multiplexing with conventional UE |
|---|---|---|---|
| Alternative-A (narrow) | Intermediate | 9 bits/13 bits | Intermediate |
| Alternative-B (limited to RIV) | High | 9 bits/12 bits | High |
| Alternative-C (no optimization) | High | 10 bits/12 bits | High |
| Alternative-D | Low | 4 bits/8 bits | Low |
| Alternative-E | Intermediate | 7 bits/9 bits | Intermediate |

(2.1.2. CE Mode B with Respect to PDSCH)

In the previous conference, a maximum PDSCH which is further increased with respect to a CE mode B was adopted in the Rel-14, and a 5 MHz PDSCH was supported. To take into account resource allocation based on a conventional DCI6-1B used with respect to a PDSCH CE mode B, in most cases where resource allocation is repeated, large scheduling flexibility is unnecessary for the resource allocation. Accordingly, the DCI6-1B resource allocation has only 1 bit which means 4 PRBs or 6 PRBs with which the instruction of the NB index is expected. In addition to the above, even when fine resource allocation is supported, a scheduling gain is not large. Accordingly, a bit size is a most important factor with respect to a CE mode B. A small bit length can hold a DCI coding rate at a low level. Accordingly, the inventors of the present invention support the instruction "start NB index+NB bit map" with respect to a PDSCH in a CE mode B. For example, the start NB index and the NB bit map are formed of 8 bits (4 bits+4 bits) with respect to a 20 MHz system bandwidth.

Proposal 4: A start NB index+an NB bit map are to be supported with respect to a PDSCH in a CE mode B.

(2.2. Allocation of RBs with Respect to Non-BL UE)
(2.2.1. CE Mode A)
(2.2.1.1. PDSCH)

As described in Table 4, the non-BL UE in a CE mode A can support 5 MHz and 20 MHz. To take into account the reduction of efforts for standardization and the reduction of complexity, it is desirable that the same RB assigning method is adopted by both a BL/CE UE and a non-BL UE. Accordingly, the inventors of the present invention support "start narrowband index+bit map of RBG". However, the non-BL UE is configured to receive 20 MHz and hence, a start narrowband index becomes unnecessary.

Proposal 5: A start narrowband index+a bit map of RBG are to be supported with respect to a PDSCH of a non-BL UE in a CE mode A. When the non-BL UE operates a 20 MHz PDSCH, a start narrowband index is to be excluded.

(2.2.1.2. PUSCH)

A PUSCH with respect to a non-BL UE in a CE mode A supports the same 5 MHz as a PUSCH of a BL/CE UE in a CE mode A. Accordingly, it is unnecessary for the inventors of the present invention to support an additional new resource allocation method. The inventors of the present invention support the same method which is an existing PUSCH type 0.

Proposal 6: An existing PUSCH type 0 is to be supported with respect to a non-BL UE which operates a 5 MHz PUSCH in a CE mode A.

(2.2.2. CE Mode B)
(2.2.2.1. PDSCH)

With respect to a non-BL UE PDSCH in a CE mode B, a UE is established at 1.4 MHz, 5 MHz, or 20 MHz. To take into account the reduction of efforts for standardization and the reduction of complexity, it is desirable to adopt the same RB assigning method. A 1.4 MHz channel bandwidth is equal to a channel bandwidth of a conventional eMTC. Accordingly, a conventional resource allocation method (a narrowband index+1 bit) can be reused. On the other hand, with respect to 5 MHz and 20 MHz, resource allocation is to be based on a 5 MHz BL/CE UE. This means that a start NB index+an NB bit map is to be supported. However, when the UE is established at 20 MHz, the BL/CE UE performs reception over the entire bandwidth and hence, a start NB index becomes unnecessary.

Proposal 7: Resource allocation (a narrowband index and 1 bit) of a Rel-13eMTC with respect to a PDSCH in a CE mode B is to be reused with respect to a non-BL UE PDSCH in a CE mode B within 1.4 MHz bandwidth.

Proposal 8: A narrowband index+an NB bit map are to be supported with respect to a non-BL UE PDSCH in a CE mode B at 5 MHz and 20 MHz. When a non-BL UE operates a 20 MHz PDSCH, a start narrowband index is to be excluded.

(2.2.2.2. PUSCH)

A PUSCH with respect to a non-BL UE in a CE mode B supports 1.4 MHz which is the same bandwidth as Rel-13eMTC resource allocation. Accordingly, it is unnecessary for the inventors of the present invention to support an additional new resource allocation method. The inventors of the present invention support the same method which is a narrowband index+3 bits.

Proposal 9: resource allocation (a narrowband index and 3 bits) of a Rel-13eMTC with respect to a PUSCH in a CE mode B is to be reused with respect to a non-BL UE PUSCH in a CE mode B within 1.4 MHz bandwidth.

The whole contents of the U.S. provisional application 62/454,193 (filed on Feb. 3, 2017) is incorporated in this specification by reference.

INDUSTRIAL APPLICABILITY

The present invention is useful in a mobile communication field.

The invention claimed is:

1. A base station that performs radio communication with a radio terminal using at least one narrow frequency band where the number of resource blocks is limited to a predetermined resource block number, the base station comprising:

a transmitter configured to transmit, to the radio terminal, configuration information for frequency hopping where the radio communication is performed while switching the narrow frequency band; and a controller configured to allocate, to the radio terminal, a first frequency band of the frequency hopping and a frequency band of a hopping destination, wherein the first frequency band and the frequency band of the hopping destination respectively include the narrow frequency band, the first frequency band further includes the fraction resource blocks, the fraction resource blocks are resource blocks, the number of which is smaller than the predetermined resource block number and are positioned adjacently to the narrow frequency band in a frequency domain, and the transmitter is configured to receive, to the radio terminal, a notification indicating whether or not the fraction resource blocks are to be used in the radio communication with respect to the frequency band of the hopping destination when the first frequency band includes the allocated fraction resource blocks and the frequency band of the hopping destination does not include the allocated fraction resource blocks.

2. The base station according to claim 1, wherein the radio communication is an uplink communication, and the fraction resource blocks are positioned adjacently to the narrow frequency band, and are resource blocks, the number of which is smaller than the predetermined resource block number.

3. A radio terminal that performs radio communication with a base station using at least one narrow frequency band where the number of resource blocks is limited to a predetermined resource block number, the radio terminal comprising:

a receiver configured to receive, from the base station, configuration information for performing frequency hopping where the radio communication is performed while switching the narrow frequency band, and allocation information relating to allocation of a first frequency band of the frequency hopping and a frequency band of the hopping destination; and a controller configured to control the radio communication using the frequency hopping based on the configuration information and the allocation information, wherein the first frequency band and the frequency band of the hopping destination respectively include the narrow frequency band allocated from the base station, and the first frequency band further includes the fraction resource blocks allocated from the base station, the fraction resource blocks are resource blocks, the number of which is smaller than the predetermined resource block number, and are positioned adjacently to the narrow frequency band in a frequency domain, the receiver is configured to receive, from the base station, a notification indicating whether or not the fraction resource blocks are to be used in the radio communication with respect to the frequency band of the hopping destination when the first frequency band includes the allocated fraction resource blocks and the frequency band of the hopping destination does not include the allocated fraction resource blocks, and the controller is configured to decide whether or not the fraction resource blocks are to be used in the radio communication with respect to the frequency band of the hopping destination based on the notification from the base station.

4. The radio terminal according to claim 3, wherein the radio communication is an uplink communication, and the fraction resource blocks are positioned adjacently to the narrow frequency band, and are resource blocks, the number of which is smaller than the predetermined resource block number.

5. The radio terminal according to claim 3, wherein, when the fraction resource blocks are not used in the radio communication with respect to the other frequency band, the controller is configured to apply a transport block size corresponding to the number of resource blocks of the other frequency band, to both of the one frequency band and the other frequency band, and the number of resource blocks of the other frequency band is the number of resource blocks from which the fraction resource blocks are excluded.

6. A radio communication system comprising:

a radio terminal configured to use at least one narrow frequency band where the number of resource blocks is limited to a predetermined resource block number; and a base station configured to transmit, to the radio terminal, configuration information for frequency hopping where radio communication with the radio terminal is performed while switching the narrow frequency band to the radio terminal, wherein the radio terminal includes:

a receiver configured to receive, from the base station, the configuration information and allocation information relating to allocation of a first frequency band of the frequency hopping and a frequency band of a hopping destination; and a controller configured to control the radio communication using the frequency hopping based on the configuration information and the allocation information, the first frequency band and the frequency band of the hopping destination respectively include the narrow frequency band allocated from the base station, the first frequency band further includes fraction resource blocks allocated from the base station, the fraction resource blocks are resource blocks, the number of which is smaller than the predetermined resource block number and are positioned adjacently to the narrow frequency band in a frequency domain, the receiver is configured to receive, from the base station, a notification indicating whether or not the fraction resource blocks are to be used in the radio communication with respect to the frequency band of the hopping destination when the first frequency band includes the allocated fraction resource blocks and the frequency band of the hopping destination does not include the allocated fraction resource blocks, and the controller is configured to decide whether or not the fraction resource blocks are to be used in the radio communication with respect to the frequency band of the hopping destination based on the notification from the base station.

* * * * *